(12) United States Patent
Perkins et al.

(10) Patent No.: US 12,136,713 B2
(45) Date of Patent: Nov. 5, 2024

(54) BATTERY RECYCLING

(71) Applicant: FORM ENERGY INC., Somerville, MA (US)

(72) Inventors: Nicholas Reed Perkins, Somerville, MA (US); Isabella Caruso, Cambridge, MA (US); Rachel Elizabeth Mumma, Somerville, MA (US); Anthony Tran, Boston, MA (US); Rupak Chakraborty, Brookline, MA (US); Matthew Edward Via, Boston, MA (US); Jocelyn Marie Newhouse, Somerville, MA (US); Jarrod David Milshtein, Arlington, MA (US); Liang Su, Medfield, MA (US); Michael Andrew Gibson, Philadelphia, PA (US); Danielle Cassidy Smith, Cambridge, MA (US); William Henry Woodford, Somerville, MA (US); Amelie Nina Kharey, Cambridge, MA (US)

(73) Assignee: FORM ENERGY, INC., Somerville, MA (US)

( * ) Notice: Subject to any disclaimer, the term of this patent is extended or adjusted under 35 U.S.C. 154(b) by 106 days.

(21) Appl. No.: 17/313,865

(22) Filed: May 6, 2021

(65) Prior Publication Data
US 2021/0351450 A1 Nov. 11, 2021

Related U.S. Application Data

(60) Provisional application No. 63/021,169, filed on May 7, 2020.

(51) Int. Cl.
*H01M 10/54* (2006.01)
*C21B 13/00* (2006.01)
(Continued)

(52) U.S. Cl.
CPC ......... *H01M 10/54* (2013.01); *C21B 13/0046* (2013.01); *C22B 1/02* (2013.01);
(Continued)

(58) Field of Classification Search
CPC ....... H01M 10/54; Y02P 10/20; Y02W 30/84; C22B 7/00; C22B 7/001; C22B 7/002;
(Continued)

(56) References Cited

U.S. PATENT DOCUMENTS 4,784,688 A * 11/1988 Anderson ............. C22B 3/1658
423/53
2013/0280623 A1 10/2013 Yoshida et al.
(Continued)

FOREIGN PATENT DOCUMENTS

CN 109574048 A * 4/2019 ............. C01B 25/28
JP 2013001990 A 1/2013
(Continued)

OTHER PUBLICATIONS

KR20200043844A supplemental machine translation, Espacenet, originally published Apr. 28, 2020, translated Jul. 17, 2023 (Year: 2020).*
(Continued)

*Primary Examiner* — George Wyszomierski
*Assistant Examiner* — Nikolas Takuya Pullen
(74) *Attorney, Agent, or Firm* — The Marbury Law Group, PLLC

(57) ABSTRACT

Various embodiments relate to several processes that may recover commodity chemicals from an alkaline metal-air battery. In various embodiments, while the cell is operating, various side products and waste streams may be collected and processed to regain use or additional value. Various embodiments also include processes to be performed after the cell has been disassembled, and each of its electrodes
(Continued)

have been separated such as not to be an electrical hazard. The alkaline metal battery recycling processes described herein may provide multiple forms of commodity iron, high purity transition metal ores, fluoropolymer dispersions, various carbons, commodity chemicals, and catalyst dispersions.

4 Claims, 14 Drawing Sheets

(51) Int. Cl.
*C22B 1/02* (2006.01)
*C22B 3/04* (2006.01)
*C22B 3/12* (2006.01)
*C22B 3/16* (2006.01)
*C22B 7/00* (2006.01)

(52) U.S. Cl.
CPC .................. *C22B 3/04* (2013.01); *C22B 3/12* (2013.01); *C22B 3/16* (2013.01); *C22B 7/00* (2013.01); *C22B 7/006* (2013.01); *Y02P 10/20* (2015.11); *Y02W 30/84* (2015.05)

(58) Field of Classification Search
CPC ......... C22B 7/003; C22B 7/004; C22B 7/006; C22B 7/007; C22B 7/008
See application file for complete search history.

(56) References Cited

U.S. PATENT DOCUMENTS

| | | | |
|---|---|---|---|
| 2016/0201521 A1* | 7/2016 | Karthauser | F25B 25/02 60/641.2 |
| 2017/0033382 A1 | 2/2017 | Tzidon et al. | |
| 2017/0294661 A1 | 10/2017 | Melman et al. | |

FOREIGN PATENT DOCUMENTS

| | | |
|---|---|---|
| JP | 2015099707 A | 5/2015 |
| JP | 2018113182 A | 7/2018 |
| JP | 2020013665 A | 1/2020 |
| KR | 20190111168 A | 10/2019 |
| KR | 20200043844 A | 4/2020 |

OTHER PUBLICATIONS

JP2020013665A supplemental machine translation, Espacenet, originally published Jan. 23, 2020, translated Jul. 17, 2023 (Year: 2020).*
Concrete web article, Feb. 20, 2006, MadeHow (Year: 2006).*
JP2013001990A supplemental machine translation, Espacenet, originally published Jan. 7, 2013, translated Jul. 24, 2023 (Year: 2020).*
Notification of Transmittal of the International Search Report and the Written Opinion of the International Searching Authority for International Patent Application No. PCTUS2021/031199, mailed on Aug. 27, 2021, 15 pages.
Freitas, M. B. J. G. et al., "Recycling manganese from spent Zn—MnO2 primary batteries", Journal of Power Sources, vol. 164, Issue 2, pp. 947-952, (2006); https://doi.org/10.1016/j.jpowsour. 2006.10.050.
International Preliminary Report on Patentability for International Application No. PCT/US2021/031199, mailed Nov. 17, 2022, 10 Pages.
Extended European Search Report for European Patent Application No. 201799498.7, mailed Sep. 2024, 5 pages.
Ismail, Z.Z. et al., "Reuse of Waste Iron as a Partial Replacement of Sand in Concrete," Science Direct, Waste Management, vol. 28, pp. 2048-2053, (2008); https://doi.org/10.1016/j.wasman.2007.07.009.

* cited by examiner

BATTERY RECYCLING

RELATED APPLICATIONS

This application claim priority to U.S. Provisional Application No. 63/021,169 filed May 7, 2020 entitled "Battery Recycling", the entire contents of which are incorporated herein by reference for all purposes.

BACKGROUND

Energy storage technologies are playing an increasingly important role in electric power grids; at a most basic level, these energy storage assets provide smoothing to better match generation and demand on a grid. The services performed by energy storage devices are beneficial to electric power grids across multiple time scales, from milliseconds to years. Today, energy storage technologies exist that can support timescales from milliseconds to hours, but there is a need for long and ultra-long duration (collectively, at least ≥8 h) energy storage systems.

In deployment of large-scale long duration energy storage devices, there will be substantial volumes of spent electrode materials. At end-of-life the electrodes have lost functional electrochemical value, but still maintain high materials value. A large amount of the associated costs in the battery come from manufacturing these electrodes from raw materials. Additionally, in order to operate and maintain the storage asset, materials are introduced constantly over the life of the cell, and significant side products including gases, solids, and heat are generated during use. Recovering as much value from these materials is important not only for maximizing asset value but also for maintaining stable performance.

This Background section is intended to introduce various aspects of the art, which may be associated with embodiments of the present inventions. Thus, the foregoing discussion in this section provides a framework for better understanding the present inventions, and is not to be viewed as an admission of prior art.

SUMMARY

Various embodiments relate to several processes that may recover commodity chemicals from an alkaline metal-air battery. While the cell is operating, various side products and waste streams may be collected and processed to regain use and/or for additional value. Various embodiments also include processes to be performed after the cell has been disassembled, and each of its electrodes have been separated such as not to be an electrical hazard. The alkaline metal battery recycling processes described here may provide multiple forms of commodity iron, high purity transition metal ores, fluoropolymer dispersions, various carbons, commodity chemicals, and catalyst dispersions. These processes allow for significant sources of revenue that may help offset materials, processing, and operations costs.

Various embodiments may enable recycling of an electrode to commodity iron. Various embodiments may include fluid assisted electrode recycling. Various embodiments may include eduction of heavily oxidized iron back to metallic powder. Various embodiments may include processes to neutralize spent alkaline metal battery electrode for sale as a commodity iron. Various embodiments may include electrochemical reduction of spent alkaline metal battery electrode for use as iron source. Various embodiments may include pelletization of spent alkaline metal battery electrode for use as an iron source for reduction.

Various embodiments may enable recapture of electrode materials. Various embodiments may include recycling of Bimetallic Oxygen Evolution Electrodes. Various embodiments may include treatment to regain surface hydrophobicity properties for a gas diffusion electrode. Various embodiments may include separation of gas diffusion electrode components.

Various embodiments may enable spent electrode secondary use. Various embodiments may include use of spent alkaline metal air electrode to form metal based concrete. Various embodiments may include spent iron from alkaline iron-air batteries being used as a starter for artificial coral reefs. Various embodiments may include making High Value $MnO_2$ from Low cost $MnO_2$—electrochemical conversion.

Various embodiments may enable utilization of cell waste streams. Various embodiments may include hydrogen capture. Various embodiments may include heat energy recapture. Various embodiments may include methods for regeneration of $CO_2$ scrubbing agents.

BRIEF DESCRIPTION OF THE DRAWINGS

The accompanying drawings, which are incorporated herein and constitute part of this specification, illustrate example embodiments of the claims, and together with the general description given above and the detailed description given below, serve to explain the features of the claims.

DETAILED DESCRIPTION

Figure 1A:
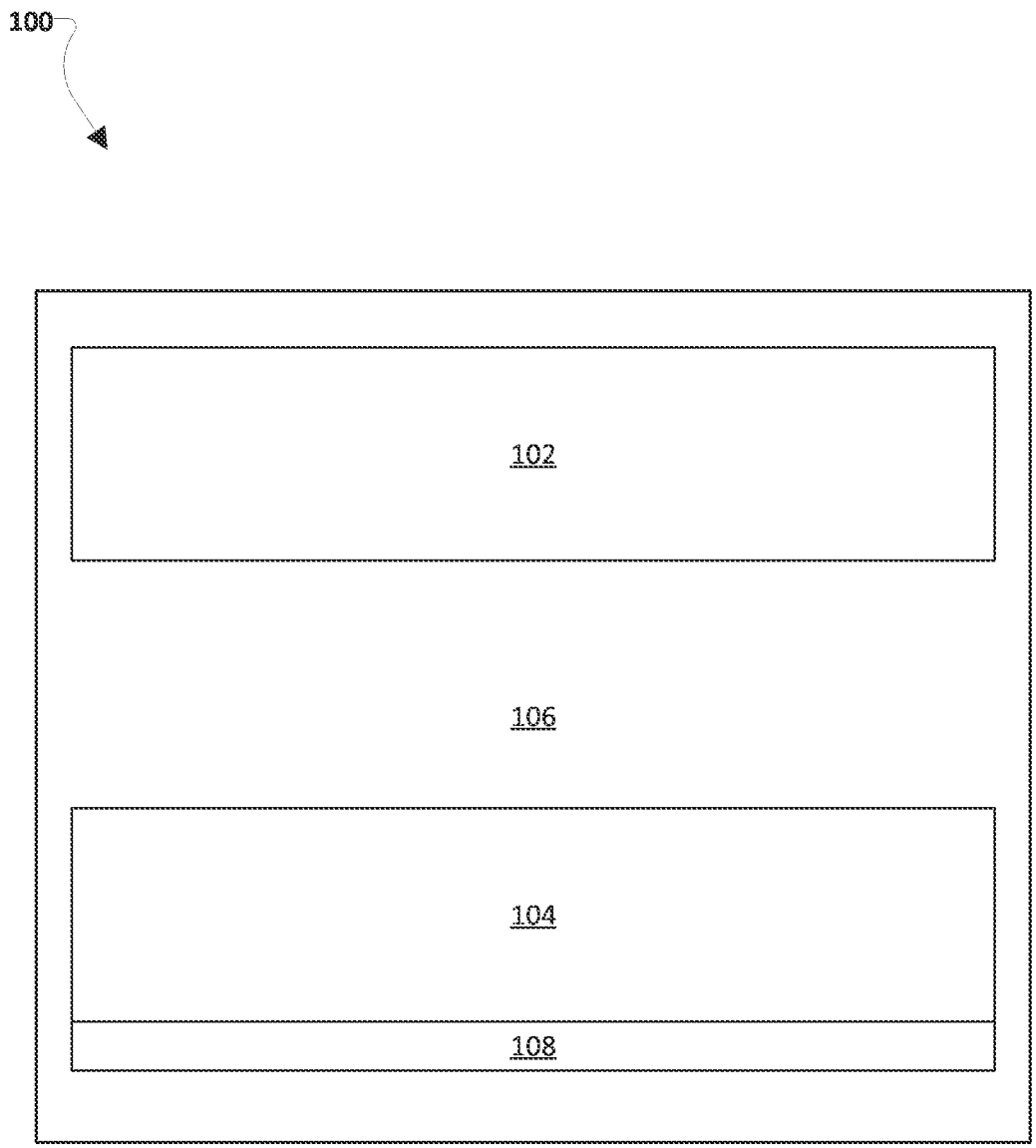
FIG. 1A is a schematic of a portion of an electrochemical cell according to various embodiments.

References made to particular examples and implementations are for illustrative purposes and are not intended to limit the scope of the claims. The following description of the embodiments of the invention is not intended to limit the invention to these embodiments but rather to enable a person skilled in the art to make and use this invention.

The following examples are provided to illustrate various embodiments of the present systems and methods of the present inventions. These examples are for illustrative purposes, may be prophetic, and should not be viewed as limiting, and do not otherwise limit the scope of the present inventions.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims. The following description of the embodiments of the invention is not intended to limit the invention to these embodiments but rather to enable a person skilled in the art to make and use this invention. Unless otherwise noted, the accompanying drawings are not drawn to scale.

As used herein, unless stated otherwise, room temperature is 25° C. And, standard temperature and pressure is 25° C. and 1 atmosphere. Unless expressly stated otherwise all tests, test results, physical properties, and values that are temperature dependent, pressure dependent, or both, are provided at standard ambient temperature and pressure.

Generally, the term "about" as used herein unless specified otherwise is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories may not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and, with existing equipment or activities which may be modified, in-part, based on the teachings of this specification. Further, the various embodiments and examples set forth in this specification may be used with each other, in whole or in part, and in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular figure.

Embodiments of the present invention include apparatus, systems, and methods for long-duration, and ultra-long-duration, low-cost, energy storage. Herein, "long duration" and/or "ultra-long duration" may refer to periods of energy storage of 8 hours or longer, such as periods of energy storage of 8 hours, periods of energy storage ranging from 8 hours to 20 hours, periods of energy storage of 20 hours, periods of energy storage ranging from 20 hours to 24 hours, periods of energy storage of 24 hours, periods of energy storage ranging from 24 hours to a week, periods of energy storage ranging from a week to a year (e.g., such as from several days to several weeks to several months), etc. In other words, "long duration" and/or "ultra-long duration" energy storage cells may refer to electrochemical cells that may be configured to store energy over time spans of days, weeks, or seasons. For example, the electrochemical cells may be configured to store energy generated by solar cells during the summer months, when sunshine is plentiful and solar power generation exceeds power grid requirements, and discharge the stored energy during the winter months, when sunshine may be insufficient to satisfy power grid requirements.

FIG. 1 is a schematic of portions of an electrochemical cell, such as a battery 100, according to various embodiments. The battery 100 may include a positive electrode 102, an electrolyte 106, and a negative electrode 104. In various embodiments, the negative electrode 104 may integrate a current collector 108. As specific examples, the battery 100, positive electrode 102, electrolyte 106, the negative electrode 104, and/or current collector 108 may be any battery, positive electrode, electrolyte, negative electrode, and/or current collector described in U.S. Patent Application Publication No. 2020/0036002, U.S. Patent Application Publication No. 2021/0028452, and/or U.S. Patent Application Publication No. 2021/0028457, the entire contents of all three of which are hereby incorporated by reference for all purposes. One or more batteries 100 may be connected together in an energy storage system, such as a long-duration energy storage system, an ultra-long-duration energy storage system, etc. In various embodiments, one or both of the positive electrode 102 and/or the negative electrode 104 may be metal electrodes, such as electrodes including metal, such as iron, etc.

In various embodiments, the electrolyte 106 may be any electrolyte known in the art, such as any electrolyte useful for metal batteries. The current collector 108 may be a mesh or other porous surface integrated into the material used in a process uses to form the negative electrode 104. The current collector 108 may be a metal plate. The current collector 108 may be metallurgical bonded or placed in electrical communication with the electrode 104 via mechanical pressure. The electrode 104 may be so conductive that it does not need current collection along its entire length, but rather solely requires current collection on tabs at the electrode's 104 top. Alternatively, the electrode 104 may be configured such that its conductivity may be quite poor and current collection may be needed along the entire electrode area.

The positive electrode 102 may also be referred to as a counter electrode, and the counter electrodes for such positive electrode 102 may be any counter electrodes known in the art, such as any counter electrodes for alkaline iron batteries.

Electrode To Commodity Iron Source.

Various systems and methods for converting a metal electrode (e.g., 102, 104) at the end of its useful life in an electrochemical system into a source of commodity iron are disclosed. In an embodiment, the metal comprises iron, and in the preferred embodiment, the metal comprises direct reduced iron (DRI).

Various embodiments may provide for fluid assisted electrode (e.g., 102, 104) recycling.

In various embodiments, the recycling of the metal electrode (e.g., 102, 104) is assisted by a fluid. One advantage of using a fluid-assisted process is that it allows for large amounts of spent alkaline metal electrodes to be processed at the end-of-life.

Figure 1B:
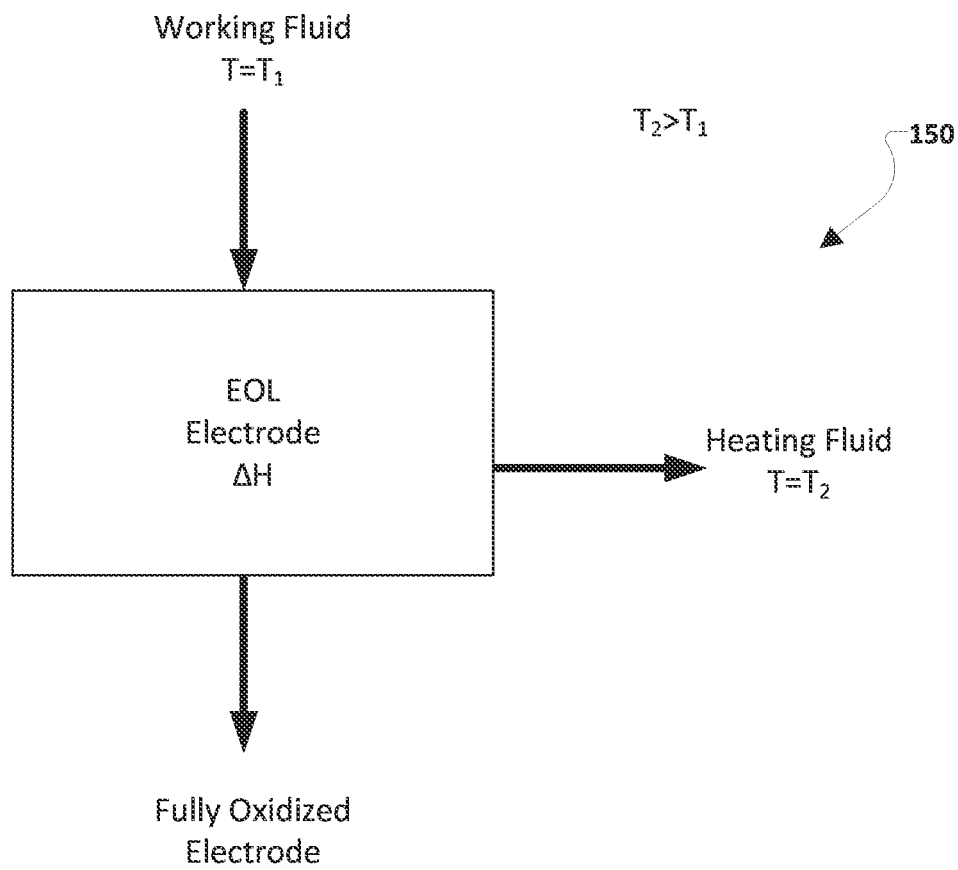
FIG. 1B is a schematic showing the movement of various fluids through a metal electrode at the end of its useful life as an electrode, and the removal of oxidized metal electrode.
Figure 1C:
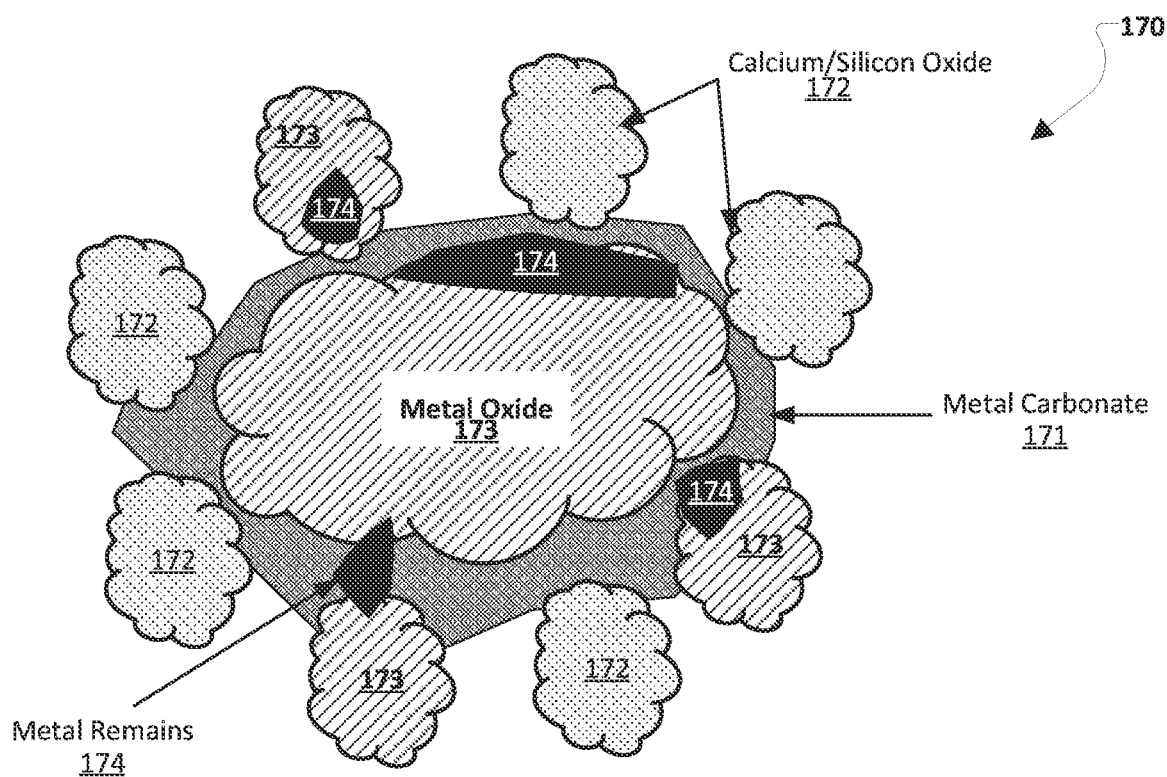
FIG. 1C is an example microstructure of an aggregate material, useful for structural applications in compression, made from various oxides and held together by a metal carbonate that comprises the contiguous phase.

In some embodiments, upon decommissioning of the electrochemical system, a fluid is pumped through the electrolyte management system into the porous metal electrodes (e.g., 102, 104), for example as shown in FIG. 1B. Specifically, FIG. 1B shows a working fluid pumped through an end-of-life (EOL) metal electrode 150 (e.g., 102, 104). For example, fluid may be circulated via a pump of an electrolyte management system and through the housing of the battery, such as battery 100, in a manner similar to how electrolyte (e.g., electrolyte 106) was recirculated and/or replenished in the battery while the battery was in operation prior to decommissioning. In some embodiments, the fluid comprises an aqueous solvent that contains a material that is known to facilitate exothermic chemical reactions of the metal electrode 150 with ambient oxygen or itself, for instance, saltwater or an alkaline solution. In other embodiments, the fluid comprises an organic solvent that contains a material that is known to facilitate exothermic chemical reactions of the metal electrode 150 with ambient oxygen or itself. In some embodiments, the fluid itself may contain dissolved oxygen, which reacts with the metal electrode 150 to produce metal oxides. In some embodiments, the heat released from this process is used for a variety of purposes in the plant, and the fully oxidized metal is recovered. In some embodiments, the combination of the elevated temperatures (e.g., $T_1 < T_2$) produced by the exothermic reaction, in combination with previous electrochemical conversion processes, results in a metal oxide with crystalline features, uniform composition, and well controlled particle size distribution.

Various embodiments may provide for reduction of heavily oxidized iron back to metallic powder.

In various embodiments, the oxidized metal electrode (e.g., 102, 104) is electrochemically reduced to a metallic powder in order to facilitate reuse or sale. In the process of electrochemical conversion, a bulk metal electrode (e.g., 102, 104) may undergo significant size reduction and phase conversion during its lifetime. In one embodiment, a metal electrode (e.g., 102, 104) after being utilized is removed from the electrochemical system, and the electrode material is removed from any mechanical apparatus that may be present, for instance, apparatus for containment of a pelletized bed, or current collectors. The metal electrode material is first dried, and mechanical forces are then applied to reduce the particle size. In some embodiments, the material is sifted to remove material below a certain critical size. The resulting powder is then separated into metallic particles, oxide particles, and non-metallic particles, for instance, carbonate particles, through a density-based separation. The oxide powder may be further chemically reduced in a furnace or electrochemical reduction process and sold as metallic powder.

Various embodiments may provide a process to neutralize a spent alkaline metal battery electrode (e.g., 102, 104) for sale as a commodity iron.

In various embodiments, an end-of-life metal air electrode (e.g., 102, 104) is removed from the reactor and treated with a variety of liquids. The purpose of these liquids is to neutralize caustic species from the electrode as well as to remove trace soluble impurities in the electrode. The liquids used should be decreasing in pH such that the electrode is not dissolved in the process. The remaining metal may be used as a source of commodity iron ore. This ore may further be pelletized back into particles in order to be fed into a reduction process to come out as a porous iron source. Additionally, this byproduct may be introduced into an electrochemical process that may reduce the iron into a metallic form again. In another embodiment after the pelletized iron is reduced, it may be used to form the new electrode of another alkaline metal air battery.

Various embodiments may provide for recapture of electrode (e.g., 102, 104) materials.

Various embodiments may include recycling of bimetallic oxygen evolution electrodes (e.g., 102, 104). In various embodiments, a bimetallic oxygen evolution electrode (e.g., 102, 104) may be removed from the reactor and dissolved with an acidic solution. Once the electrode has been fully digested, the solution may be titrated such that the higher price metal may be selectively isolated from the lower cost metal. The lower cost metal may be separated out additionally for extra revenue.

Various embodiments may include treatment to regain surface hydrophobicity properties for a gas diffusion electrode (e.g., 102, 104). Gas diffusion electrodes largely fail over life due to a loss of hydrophobicity. Various embodiments may provide multiple ways to regain hydrophobic properties. In one embodiment, the gas diffusion layer may be separated from the electrode (e.g., 102, 104), rinsed and surface treated with an electron source, or reprocessed to return its polymer to a crystalline form. This gas diffusion layer may be shredded and used as source powder. In the case of the active layer, the electrode may be once again rinsed to remove any crystal impurities. The electrode may then be mechanically treated to remove the current collector (e.g., 108) from the carbon active layer. The metal may be recycled through thermal, solution, or electrochemical processes. The carbon powder may regain its hydrophobicity by reducing the surface species and separating out various sizes of carbon.

Various embodiments may provide for separation of gas diffusion electrode (e.g., 102, 104) components. Various embodiments may provide a process to separate various components of a gas diffusion electrode into their own process streams. As an example, a gas diffusion electrode may contain, carbon, catalyst, metal current collectors, and a hydrophobic binder. First the electrode may be shredded to expose surface area, before being treated with an acid solution to separate the metal current collector into solution. The next step may be to introduce specialized surfactants that are used to solubilize the hydrophobic binder and carbon. These two solutions are then separated and may be further treated to become reactants in electrode production.

Various embodiments may enable capture of non-active materials. Much of the total energy storage system is made up of non-active materials that are not involved in the electrochemical reactions that store or supply electricity. These materials often have value on their own and may out last the lifetime of the active electrodes (e.g., 102, 104). In some embodiments of the plant, many subsystems are made of metal components. In one embodiment, an air compressor may be used to deliver air to air electrodes. This compressor, at end-of-life, may be reused or sold for scrap. In another embodiment, the mechanical structure supporting the reactors is made of metal. At the end-of-life for the plant, this metal may be reused as metal parts for other projects or sold for scrap. In any energy storage system, metals are used for current conduction. For large scale energy storage systems, a large amount of metal is required to carry current. This metal, at the end of plant life, may be reused in the plant, recycled as metal parts for other projects, or sold for scrap. Additionally, in situations where the entire plant is made up of many repeated modules, larger system failures may leave behind modules that still are operational. These modules may be used or refurbished into another plant. In another embodiment the failure of a larger module may be due to a single of its components. In one case, the vessel may spring a leak, but the electrodes, internal air delivery, current collection, switch, etc., may all still be in perfect condition. These parts may be used in a new reactor vessel, saving the time and money to manufacture and deliver those parts. This may occur within the same plant, or between plants as needed.

Various embodiments may include spent electrode secondary uses. In various embodiments, a spent alkaline metal air electrode may be used to form metal-based concrete. After the end-of-life has been reached for a metal electrode in an alkaline metal air battery, the electrode often still contains metal, oxides, and caustic solutions. Additionally, many alkaline metal air cells will also contain amounts of soda lime that has been used to sequester carbon dioxide. In this process, a mechanical process is described that takes advantage of the non-cycled metal, leftover caustic material, and various impurities to build a cement. The main volume contributors of the material will be the metal oxides present in the electrode over life which will be held together by a cement that is made of caustic soda, atmospheric carbon, and unreacted metal. An example microstructure 170 of the cement according to various embodiments can be found in FIG. 1C. The microstructure 170 may include calcium/silicon oxide 172, metal remains 174, metal oxide 173, and metal carbonate 171. The microstructure 170 may be made from various oxides 172, 173 and held together by the metal carbonate 171 that comprises the contiguous phase. The microstructure 170 may be useful for structural applications in compression. This concrete substitute will continue to uptake carbon dioxide as it sets and may be used as an alternative for concrete in various situations.

In various embodiments, spent iron from alkaline iron-air batteries as a starter for artificial coral reefs. Spent iron at the end-of-life of an alkaline iron-air battery will likely be a low value waste product (or side product). Shipping costs alone may significantly increase recycling costs of iron electrode material in large stationary energy storage plants. Spent iron material at the end-of-life of an iron-air energy storage plant may be disposed of in an environmentally conscious way by using the iron material to seed artificial coral reefs. The iron electrode material may need to be sufficiently rinsed prior to introduction to the ocean environment. Rinsing may remove surface contamination of electrolyte chemicals on the iron. The iron material may then be dumped into the ocean. This may be especially convenient for ocean-side energy storage installations, or installations with facile barge access.

Various embodiments may include making high value $MnO_2$ (manganese dioxide or manganese(IV) oxide) from low cost $MnO_2$ electrochemical conversion. Different phases of $MnO_2$ (alpha-, beta-, gamma-, delta-, epsilon-, lamda-, etc) have different activity for different applications. They also cost differently as well. For instance, the price of natural $MnO_2$ (beta-$MnO_2$) can be as low as <$1.0/kg; that of birnessite (delta-$MnO_2$) would be as high as >$4/kg. Various embodiments may include in situ conversion of low cost $MnO_2$ to high cost $MnO_2$ using electrochemical methods. Appropriate additives may be required for achieving the structure of interest. Additives may include $Bi_2O_3$, copper, iron, etc. or the combinations thereof. Electrochemical methods include cyclic voltammetry, constant current, constant potential, constant power, or the combinations thereof. In an ideal case, a list of additives corresponding to a particular structure/phase of $MnO_2$ may be generated and those additives may be added to the battery to convert low cost $MnO_2$ to high cost $MnO_2$. This list of additives may or may not be dependent on the starting structure/phase of $MnO_2$. These same processes may also be applicable to any source of $MnO_2$ including the cathodes of primary alkaline batteries that need to be disposed of.

Various embodiments may provide for conversion of battery grade rechargeable alkaline manganese to catalyst quality. Rechargeable alkaline manganese (RAM) is a promising cathode material for low-cost long-duration energy storage. The main decay mechanism of RAM is the formation of $Mn_3O_4$, which is less electrochemical reversible than the ideal discharge product, manganese(III) oxyhydroxide (MnOOH). For air (ORR) electrodes, $Mn_3O_4$ has higher ORR activity than the conventional $MnO_2$ ((e.g., electrolytic manganese dioxide (EMD)) catalyst. Therefore, it is possible to directly use the "end-of-life (EOL)" product of RAM (i.e., $Mn_3O_4$) as the ORR catalyst in the air electrode. Further, $Mn_3O_4$, which if purchased, is much more expensive than $MnO_2$ (e.g., electrolytic manganese dioxide (EMD)), may also be used as the starting materials for synthesizing spinel based ORR catalyst. In the best case scenario, the end-of-life RAM (EOL RAM) cathode (electrode disposition) may be directly used as the air electrode to catalyze ORR. At least, $Mn_3O_4$, as the main product in the EOL RAM may be collected and used in the fabrication of air electrode or in the synthesis of spinel-based air electrode catalysts.

Various embodiments may enable utilization of cell waste streams and waste products (or side products).

Various embodiments may enable hydrogen capture. One significant product of the cell will be hydrogen which is a potentially useful fuel given enough concentration and production. Given the various levels of concentration the hydrogen may be captured and compressed and used as a fuel. The hydrogen may be captured and compressed and sold to compressed gas providers. The hydrogen may be flared for thermal electricity generation. This may provide electricity for the plant or elsewhere.

Various embodiments may enable water capture. In the alkaline metal air battery system, water and gases are both introduced and removed from the cell. In one embodiment various humidification traps throughout the plant may be piped to the electrolyte management system to reintroduce the water lost to evaporation, carbon dioxide treatment, or produced with hydrogen recombination. In another embodiment, both a dehumidification system, for instance, a system where air is flowed over a desiccant, and a humidification system, for instance, a simple water bubbler, are connected to an oxygen reduction electrode. Water extracted from air during dehumidification is stored, and transferred to the humidification system when humidification is needed. In one embodiment, the dehumidification and humidification may be the same system, and which function is provided is either externally controlled, for instance, by controlling the temperature of the dehumidifier/humidifier, or is dependent on the humidity of the incoming air.

Various embodiments may enable heat energy recapture. The cells under operation will produce heat that may serve better purposes in other locations. The heat may be transported across a reactor or harnessed for use. The waste heat may, through thermoelectrics or heat engines, be used for thermal electricity generation. Waste heat may be moved from the electrode to the counter electrode (e.g., the anode to the cathode) to improve performance. The oxygen evolution electrode overpotential may decrease with higher temperature, but electrode performance gets worse. As a result, taking heat from the electrode and directing it to the cathode may improve performance on both fronts. If the system is kept in colder climates, heat may be used to keep the system at its nominal temperature range, meaning that less heat becomes waste.

Various embodiments may enable methods for regeneration of $CO_2$ scrubbing agents. In order to remove $CO_2$ from the quantities of air required to deliver oxygen to a large energy storage system, large amounts of $CO_2$ scrubbing material are required. The cost of this material may be significantly reduced by regenerating material and restoring it to useful condition, in order to reuse scrubbing material instead of buying more. This scrubbing material may be made out of soda lime, an amine, activated carbon, and or some form of carbon dioxide adsorbing polymer such as polymethylmethacrylate. In one embodiment, soda lime is regenerated via a causticization process in a lime kiln. In another embodiment, $CO_2$ is caused to desorb from a surface via applying heat. In another embodiment, an amine undergoes a thermal swing to desorb $CO_2$. In another embodiment, activated carbon is flushed with a low-$CO_2$ gas to desorb $CO_2$. In another embodiment, $Na_2CO_3$ or other alkali carbonate salts, formed from NaOH or other alkali hydroxides are reacted with $Ca(OH)_2$ to regenerate the alkali hydroxide.

Various embodiments may enable electrolyte (e.g., 106) recycling. Over the lifetime of an energy storage system comprising an alkaline electrolyte, the electrolyte may uptake carbon dioxide as carbonate, and concentrations of the components may change, for instance, due to water loss and alkaline salt creep. The electrolyte may eventually need to be discarded as waste. Ideally, that waste stream may be recycled and used in some way.

In one embodiment, the used electrolyte is used to scrub $CO_2$ out of the air for an energy storage system, for example, the system which produced the waste electrolyte, or a neighboring system. In another embodiment, used electrolyte is refreshed by causing the precipitation of unwanted species such as carbonates or sulfates, and by the reintroduction of chemical constituents of the electrolyte which may be depleted, for example, sulfide or hydroxide species. In one embodiment, the restored electrolyte is reused in the same electrochemical system. The electrolyte refreshment process may include removal of carbonate ions from the solution, replenishment of sulfide species, for instance, in the form of sodium sulfide, and replenishment of hydroxides, for example, sodium hydroxide, potassium hydroxide, or lithium hydroxide, but is not limited to the removal and addition of these constituents.

In the embodiment where the main (plurality dry wt. %) components of the electrolyte, comprise a hydroxide salt, for example, potassium hydroxide or sodium hydroxide, the hydroxide salt or its solution in water may be recovered for use in other industries. In one embodiment the hydroxide salt or salts, or their solutions, are used to make soap. In another embodiment, the hydroxides are utilized in the paper industry. In another embodiment, the hydroxides are recovered and sold to be used in cleaning applications, for example, in drain cleaners, or in the detergents for parts washers. In another embodiment, sodium hydroxide is recovered, purified, and used in the food industry. In another embodiment, potassium hydroxide is used in fertilizer. In another embodiment, lithium hydroxide is extracted from the solution as a high-value product. In another embodiment, lithium hydroxide is sold to lithium-ion battery manufacturers. In another embodiment, various metal carbonates are sold to concrete manufacturers, potentially after extraction to the solid state.

Figure 2A:
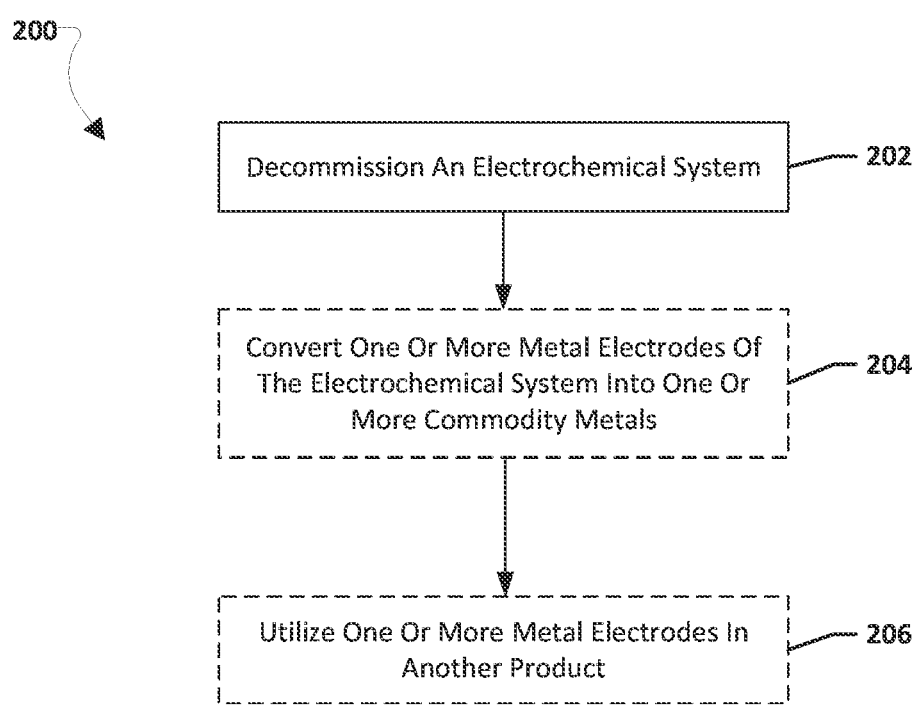
FIGS. 2A and 2B illustrate embodiment methods for recovering commodity chemicals and/or other materials from a battery, such as an alkaline metal-air battery.
Figure 2B:
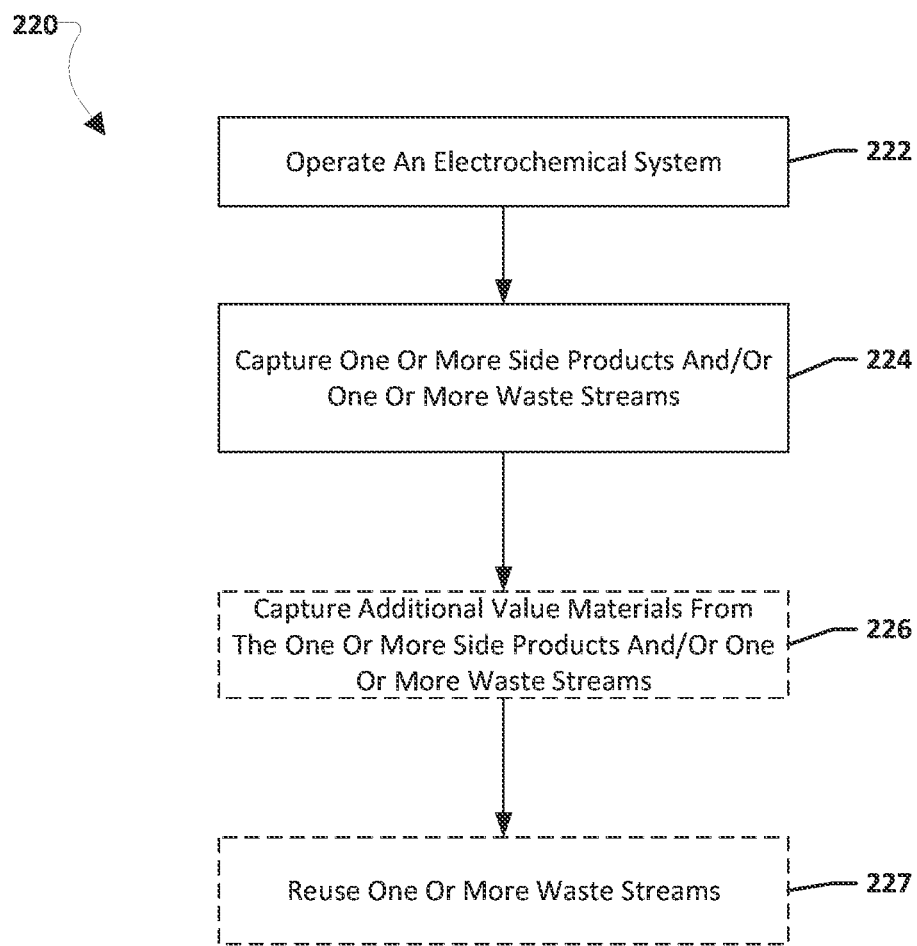

In accordance with the discussions above, FIGS. 2A and 2B illustrate embodiment methods for recovering commodity chemicals and/or other materials from a battery, such as an alkaline metal-air battery.

FIG. 2A illustrates an embodiment method 200 for recovering commodity chemicals and/or other materials from a battery, such as an alkaline metal-air battery. Specifically, method 200 may be a method for converting a metal electrode (e.g., 102, 104) to one or more commodity metals and/or utilizing one or more spent metal electrodes in another product.

In step 202, an electrochemical system may be decommissioned. For example, the battery 100 may be removed from the plant and/or designated as no longer intended to be operated for energy storage. Decommissioning may occur when a battery (e.g., 100) is at its end-of-life. In some embodiments, components of the battery (e.g., 100) may be removed as part of decommissioning. In some embodiments, components of the battery (e.g., 100) may remain in place in the battery at decommissioning.

In optional step 204, one or more metal electrodes (e.g., 102, 104) of the electrochemical system may be converted into one or more commodity metals. In some embodiments, the commodity metal may be iron. In some embodiments, the commodity metal may be DRI. In various embodiments, converting one or more metal electrodes (e.g., 102, 104) into a commodity metal may include pumping a solvent into the electrochemical system. In various embodiments, the solvent may be an aqueous solution, saltwater, an alkaline solution, and/or an organic solvent. In some embodiments, the solvent may cause an exothermic reaction used for heat in an energy plant. In various embodiments, converting one or more metal electrodes (e.g., 102, 104) into a commodity metal may include removing the metal electrode, drying the metal electrode and/or treating the metal electrode, and reducing and/or dissolving the metal electrode.

In optional step 206, one or more metal electrodes (e.g., 102, 104) of the electrochemical system may be utilized in another product (and/or for another purpose), in whole or in part. In various embodiments, utilizing one or more metal electrodes in another product and/or for another purpose may include repurposing, in whole or in part, one or more metal electrodes as a different type of electrode. As one example, a rechargeable alkaline manganese (RAM) cathode of an electrochemical system decay product, e.g., $Mn_3O_4$, etc., may be used as an ORR catalyst in an air electrode. As another example, spent iron from an alkaline iron-air battery may be used as a starter for an artificial reef. As another example, high value $MnO_2$ may be made from low cost $MnO_2$ by electrochemical conversion. As a further example, the whole, or part, of a metal electrode, such as a whole or a part present at decommissioning, a whole or a part after converting the metal electrode into one or more commodity metals, etc., may be used to form metal-based concrete. In various embodiments, utilizing one or more metal electrodes in another product and/or for another purpose may include recycling bimetallic OER electrodes, treating a gas diffusion electrode to restore surface hydrophobicity, and/or separating components of a gas diffusion electrode for different use streams.

In various embodiments, optional step 204 may be optional (e.g., performed or not performed) as converting the metal electrode may not be performed in various situations, such as because conversion may not be necessary, may not be of value, etc.

In various embodiments, optional step 206 may be optional (e.g., performed or not performed) as utilizing the one or more metal electrodes in another product (and/or for another purpose), in whole or in part, may not be performed in various situations, such as because reuse may not be necessary, may not be of value, no useful elements may remain after conversion in step 204, etc. As steps 204 and 206 are optional, in some embodiments, both steps 204 and 206 may be performed together, and in other embodiments, only one of steps 204 or 206 may be performed.

FIG. 2B illustrates an embodiment method 220 for using one or more side products and/or one or more waste streams from a battery, such as an alkaline metal-air battery. In some embodiments, method 220 may be performed in conjunction with method 200.

In step 222, an electrochemical system (e.g., battery 100 and/or a system including battery 100) may be operated. For example, the electrochemical system may be operated to store and/or discharge energy.

In step 224, one or more side products (or waste products) and/or one or more waste streams of the electrochemical system (e.g., battery 100 and/or a system including battery 100) may be captured. In various embodiments, waste stream capture may include water capture, hydrogen capture, and/or heat energy capture as described above. In various embodiments, side products (or waste products) may include $CO_2$ scrubbing agents having absorbed $CO_2$, $Na_2CO_3$ or other alkali carbonate salts, used electrolyte, etc., as described above.

In optional step 226, additional value materials may be captured from the one or more side products and/or more waste streams. In various embodiments, the additional value materials may include commodity iron, high purity transition metal ores, fluoropolymer dispersions, various carbons, commodity chemicals, and/or catalyst dispersions.

In optional step 227, the one or more waste streams may be reused. In various embodiments, reusing the one or more waste streams may include reusing or repurposing the waste streams as discussed above, such as by using one or more electrochemical cell waste stream for water capture, hydrogen capture, heat energy capture, regeneration of $CO_2$ scrubbing agents, and/or electrolyte recycling.

In various embodiments, optional step 226 may be optional (e.g., performed or not performed) as capturing additional value materials may not be performed in various situations, such as because capture may not be necessary, capture may not be of value, additional value materials may not be present, etc.

In various embodiments, optional step 227 may be optional (e.g., performed or not performed) as reuse of a waste stream may not be performed in various situations, such as because reuse may not be necessary, may not be of value, etc. As steps 226 and 227 are optional, in some embodiments, both steps 226 and 227 may be performed together, and in other embodiments, only one of steps 226 or 227 may be performed.

Various embodiments are discussed in relation to the use of direct reduced iron (DRI) as a material in an electrochemical system (e.g., a battery (or cell), etc.), as a component of an electrochemical system (e.g., a battery (or cell), etc.), and combinations and variations of these. In various embodiments, the DRI may be produced from, or may be, material which is obtained from the reduction of natural or processed iron ores, such reduction being conducted without reaching the melting temperature of iron. In various embodiments the iron ore may be taconite or magnetite or hematite or goethite, etc. In various embodiments, the DRI may be in the form of pellets, which may be spherical or substantially spherical. In various embodiments the DRI may be porous, containing open and/or closed internal porosity. In various embodiments the DRI may comprise materials that have been further processed by hot or cold briquetting. In various embodiments, the DRI may be produced by reducing iron ore pellets to form a more metallic (more reduced, less highly oxidized) material, such as iron metal ($Fe^0$), wustite (FeO), or a composite pellet comprising iron metal and residual oxide phases. In various non-limiting embodiments, the DRI may be reduced iron ore taconite, direct reduced ("DR") taconite, reduced "Blast Furnace (BF) Grade" pellets, reduced "Electric Arc Furnace (EAF)-Grade" pellets, "Cold Direct Reduced iron (CDRI)" pellets, direct reduced iron ("DRI") pellets, Hot Briquetted iron (HBI), or any combination thereof. In the iron and steelmaking industry, DRI is sometimes referred to as "sponge iron;" this usage is particularly common in India. Embodiments of iron materials, including for example embodiments of DRI materials, for use in various embodiments described herein, including as electrode materials, may have, one, more than one, or all of the material properties as described in Table 1 below. As used in the Specification, including Table 1, the following terms, have the following meaning, unless expressly stated otherwise: "Specific surface area" means, the total surface area of a material per unit of mass, which includes the surface area of the pores in a porous structure; "Carbon content" or "Carbon (wt %)" means the mass of total carbon as percent of total mass of DRI; "Cementite content" or "Cementite (wt %)" means the mass of $Fe_3C$ as percent of total mass of DRI; "Total Fe (wt %)" means the mass of total iron as percent of total mass of DRI; "Metallic Fe (wt %)" means the mass of iron in the $Fe^0$ state as percent of total mass of DRI; and "Metallization" means the mass of iron in the $Fe^0$ state as percent of total iron mass. Weight and volume percentages and apparent densities as used herein are understood to exclude any electrolyte that has infiltrated porosity or fugitive additives within porosity unless otherwise stated.

TABLE 1

| Material Property | Embodiment Range |
| --- | --- |
| Specific surface area* | 0.01-25 $m^2/g$ |
| Actual density** | 4.6-7.1 g/cc |
| Apparent density*** | 2.3-6.5 g/cc |
| Minimum $d_{pore, 90\% volume}$**** | 10 nm-50 μm |
| Minimum $d_{pore, 50\% surface area}$***** | 1 nm-15 μm |
| Total Fe (wt %)# | 65-95% |
| Metallic Fe (wt %)## | 46-90% |
| Metallization (%)### | 59-96% |
| Carbon (wt %)#### | 0-5% |
| $Fe^{2+}$ (wt %)##### | 1-9% |
| $Fe^{3+}$ (wt %)$ | 0.9-25% |
| $SiO_2$ (wt %)$$ | 1-15% |
| Ferrite (wt %, XRD)$$$ | 22-97% |
| Wustite (FeO, wt %, XRD)$$$$ | 0-13% |
| Goethite (FeOOH, wt %, XRD)$$$$$ | 0-23% |
| Cementite ($Fe_3C$, wt %, XRD)+ | «80% |

*Specific surface area preferably determined by the Brunauer-Emmett-Teller adsorption method ("BET"), and more preferably as the BET is set forth in ISO 9277 (the entire disclosure of which is incorporated herein by reference); recognizing that other tests, such as methylene blue (MB) staining, ethylene glycol monoethyl ether (EGME) adsorption, electrokinetic analysis of complex-ion adsorption' and a Protein Retention (PR) method may be employed to provide results that can be correlated with BET results.
**Actual density preferably determined by helium (He) pycnometry, and more preferably as is set forth in ISO 12154 (the entire disclosure of which is incorporated herein by reference); recognizing that other tests may be employed to provide results that can be correlated with He pycnometry results.
Actual density may also be referred to as "true density" or "skeletal density" in the art.
***Apparent density preferably determined by immersion in water, and more preferably as is set forth in ISO 15968 (the entire disclosure of which is incorporated herein by reference); recognizing that other tests may be employed to provide results that can be correlated with He pycnometry results.
Porosity may be defined as the ratio of apparent density to actual density:

TABLE 1-continued

| Material Property | Embodiment Range |
|---|---|

$$\text{Porosity} = \frac{\text{apparent density}}{\text{actual density}}$$

****$d_{pore,\ 90\%\ volume}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results.
$d_{pore,\ 90\%\ volume}$ is the pore diameter above which 90% of the total pore volume exists.
*****$d_{pore,\ 50\%\ surface\ area}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results.
$d_{pore,\ 50\%\ surface\ area}$ is the pore diameter above which 50% of free surface area exists.
Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.
Metallic Fe (wt %) preferably determined by iron(III) chloride titrimetry, and more preferably as is set forth in ISO 16878 (the entire disclosure of which is incorporated herein by reference); recognizing that other tests, such as bromine-methanol titimetry, may be employed to provide results that can be correlated with iron(III) chloride titrimetry.
Metallization (%) preferably determined by the ratio of metallic Fe to total Fe, each as preferably determined by the methods previously described.
Carbon (wt %) preferably determined by infrared absorption after combustion in an induction furnace, and more preferably as is set forth in ISO 9556 (the entire disclosure of which is incorporated herein by reference); recognizing that other tests, such as various combustion and inert gas fusion techniques, such as are described in ASTM E1019-18 may be employed to provide results that can be correlated with infrared absorption after combustion in an induction furnace.
$Fe^{2+}$ (wt %) preferably determined by titrimetry, and more preferably as is set forth in ASTM D3872-05 (the entire disclosure of which is incorporated herein by reference); recognizing that other tests, such as Mossbauer spectroscopy, X-ray absorption spectroscopy, etc., may be employed to provide results that can be correlated with titrimetry.
$Fe^{3+}$ (wt %) preferably determined by the mass balance relation between and among Total Fe (wt %), Metallic Fe (wt %), $Fe^{2+}$ (wt %) and $Fe^{3+}$ (wt %).
Specifically the equality Total Fe (wt %) = Metallic Fe (wt %) + $Fe^{2+}$ (wt %) + $Fe^{3+}$ (wt %) must be true by conservation of mass, so $Fe^{3+}$ (wt %) may be calculated as $Fe^{3+}$ (wt %) = Total Fe (wt %) − Metallic Fe (wt %) − $Fe^{2+}$ (wt %).
$$SiO_2$ (wt %) preferably determined by gravimetric methods, and more preferably as is set forth in ISO 2598-1 (the entire disclosure of which is incorporated herein by reference); recognizing that other tests, such as reduced molybdosilicate spectrophotometric methods, x-ray diffraction (XRD), may be employed to provide results that can be correlated with gravimetric methods.
In certain methods, the $SiO_2$ wt % is not determined directly, but rather the Si concentration (inclusive of neutral and ionic species) is measured, and the $SiO_2$ wt % is calculated assuming the stoichiometry of $SiO_2$; that is, a 1:2 molar ratio of Si:O is assumed.
$$$Ferrite (wt %, XRD) preferably determined by x-ray diffraction (XRD).
$$$$Wustite (FeO, wt %, XRD) preferably determined by x-ray diffraction (XRD).
$$$$$Goethite (FeOOH, wt %, XRD) preferably determined by x-ray diffraction (XRD).
†Cementite ($Fe_3C$, wt %, XRD) preferably determined by x-ray diffraction (XRD).

Additionally, embodiments of iron materials, including for example embodiments of DRI materials, for use in various embodiments described herein, including as electrode materials, may have one or more of the following properties, features or characteristics, (noting that values from one row or one column may be present with values in different rows or columns) as set forth in Table 1A.

TABLE 1A

| | | | | |
|---|---|---|---|---|
| Fe total (wt %)[1] | >60% | >70% | >80% | ~83-94% |
| $SiO_2$ (wt %)[11] | <12% | <7.5% | 1-10% | 1.5-7.5% |
| $Al_2O_3$ (wt %)[111] | <10% | <5% | 0.2-5% | 0.3-3% |
| MgO (wt %)[1111] | <10% | <5% | 0.1-10% | 0.25-2% |
| CaO (wt %)[11111] | <10% | <5% | 0.9-10% | 0.75-2.5% |
| $TiO_2$ (wt %)[&] | <10% | <2.5% | 0.05-5% | 0.25-1.5% |
| Size (largest cross-sectional distance, e.g. for a sphere the diameter) | <200 mm | ~50 to ~150 mm | ~2 to ~30 mm | ~4 to ~20 mm |
| Actual Density (g/cm³)[&&] | ~5 | ~5.8 to ~6.2 | ~4.0 to ~6.5 | <7.8 |
| Apparent Density (g/cm³)[&&&] | <7.8 | >5 | >4 | 3.4~3.6 |
| Bulk Density (kg/m³)[&&&&] | <7 | >1.5 | ~2.4 to ~3.4 | ~1.5 to ~2.0 |
| Porosity (%)[&&&&&] | >15% | >50% | ~20% to ~90% | ~50% to ~70% |

[1]Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.
[11]$SiO_2$ (wt %) preferably determined by gravimetric methods, and more preferably as is set forth in ISO 2598-1 (the entire disclosure of which is incorporated herein by reference); recognizing that other tests, such as reduced molybdosilicate spectrophotometric methods, x-ray diffraction (XRD), may be employed to provide results that can be correlated with gravimetric methods.
In certain methods, the $SiO_2$ wt % is not determined directly, but rather the Si concentration (inclusive of neutral and ionic species) is measured, and the $SiO_2$ wt % is calculated assuming the stoichiometry of $SiO_2$; that is, a 1:2 molar ratio of Si:O is assumed.
[111]$Al_2O_3$ (wt %) preferably determined by flame atomic absorption spectrometric method, and more preferably as is set forth in ISO 4688-1 (the entire disclosure of which is incorporated herein by reference); recognizing that other tests, such as x-ray diffraction (XRD), may be employed to provide results that can be correlated with flame atomic absorption spectrometric method.
In certain methods, the $Al_2O_3$ wt % is not determined directly, but rather the Al concentration (inclusive of neutral and ionic species) is measured, and the $Al_2O_3$ wt % is calculated assuming the stoichiometry of $Al_2O_3$; that is, a 2:3 molar ratio of Al:O is assumed.
[1111]MgO (wt %) preferably determined by flame atomic absorption spectrometric method, and more preferably as is set forth in ISO 10204 (the entire disclosure of which is incorporated herein by reference); recognizing that other tests, such as x-ray diffraction (XRD), may be employed to provide results that can be correlated with flame atomic absorption spectrometric method.
In certain methods, the MgO wt % is not determined directly, but rather the Mg concentration (inclusive of neutral and ionic species) is measured, and the MgO wt % is calculated assuming the stoichiometry of MgO; that is, a 1:1 molar ratio of Mg:O is assumed.
[11111]CaO (wt %) preferably determined by flame atomic absorption spectrometric method, and more preferably as is set forth in ISO 10203 (the entire disclosure of which is incorporated herein by reference); recognizing that other tests, such as x-ray diffraction (XRD), may be employed to provide results that can be correlated with flame atomic absorption spectrometric method.
In certain methods, the CaO wt % is not determined directly, but rather the Ca concentration (inclusive of neutral and ionic species) is measured, and the CaO wt % is calculated assuming the stoichiometry of CaO; that is, a 1:1 molar ratio of Ca:O is assumed.
[&]$TiO_2$ (wt %) preferably determined by a diantipyrylmethane spectrophotometric method, and more preferably as is set forth in ISO 4691 (the entire disclosure of which is incorporated herein by reference); recognizing that other tests, such as x-ray diffraction (XRD), may be employed to provide results that can be correlated with the diantipyrylmethane spectrophotometric method method.
In certain methods, the $TiO_2$ wt % is not determined directly, but rather the Ti concentration (inclusive of neutral and ionic species) is measured, and the $TiO_2$ wt % is calculated assuming the stoichiometry of $TiO_2$; that is, a 1:2 molar ratio of Ti:O is assumed.
[&&]Actual density preferably determined by helium (He) pycnometry, and more preferably as is set forth in ISO 12154 (the entire disclosure of which is incorporated herein by reference); recognizing that other tests may be employed to provide results that can be correlated with He pycnometry results.
Actual density may also be referred to as "true density" or "skeletal density" in the art.
[&&&]Apparent density preferably determined by immersion in water, and more preferably as is set forth in ISO 15968 (the entire disclosure of which is incorporated herein by reference); recognizing that other tests may be employed to provide results that can be correlated with He pycnometry results.
[&&&&]Bulk Density (kg/m³) preferably determined by measuring the mass of a test portion introduced into a container of known volume until its surface is level, and more preferably as is set forth in Method 2 of ISO 3852 (the entire disclosure of which is incorporated herein by reference); recognizing that other tests may be employed to provide results that can be correlated with the massing method.
[&&&&&]Porosity determined preferably by the ratio of the apparent density to the actual density:

$$\text{Porosity} = \frac{\text{apparent density}}{\text{actual density}}$$

The properties set forth in Table 1, may also be present in embodiments with, in addition to, or instead of the properties in Table 1A. Greater and lesser values for these properties may also be present in various embodiments.

In embodiments the specific surface area for the pellets can be from about 0.05 m²/g to about 35 m²/g, from about 0.1 m²/g to about 5 m²/g, from about 0.5 m²/g to about 10 m²/g, from about 0.2 m²/g to about 5 m²/g, from about 1 m²/g to about 5 m²/g, from about 1 m²/g to about 20 m²/g, greater than about 1 m²/g, greater than about 2 m²/g, less than about 5 m²/g, less than about 15 m²/g, less than about 20 m²/g, and combinations and variations of these, as well as greater and smaller values.

In general, iron ore pellets are produced by crushing, grinding or milling of iron ore to a fine powdery form, which is then concentrated by removing impurity phases (so called "gangue") which are liberated by the grinding operation. In general, as the ore is ground to finer (smaller) particle sizes, the purity of the resulting concentrate is increased. The concentrate is then formed into a pellet by a pelletizing or balling process (using, for example, a drum or disk pelletizer). In general, greater energy input is required to produce higher purity ore pellets. iron ore pellets are commonly marketed or sold under two principal categories: Blast Furnace (BF) grade pellets and Direct Reduction (DR Grade) (also sometimes referred to as Electric Arc Furnace (EAF) Grade) with the principal distinction being the content of $SiO_2$ and other impurity phases being higher in the BF grade pellets relative to DR Grade pellets. Typical key specifications for a DR Grade pellet or feedstock are a total Fe content by mass percentage in the range of 63-69 wt % such as 67 wt % and a $SiO_2$ content by mass percentage of less than 3 wt % such as 1 wt %. Typical key specifications for a BF grade pellet or feedstock are a total Fe content by mass percentage in the range of 60-67 wt % such as 63 wt % and a $SiO_2$ content by mass percentage in the range of 2-8 wt % such as 4 wt %.

In certain embodiments the DRI may be produced by the reduction of a "Blast Furnace" pellet, in which case the resulting DRI may have material properties as described in Table 2 below. The use of reduced BF grade DRI may be advantageous due to the lesser input energy required to produce the pellet, which translates to a lower cost of the finished material.

TABLE 2

| Material Property | Embodiment Range |
|---|---|
| Specific surface area* | 0.21-25 m²/g |
| Actual density** | 5.5-6.7 g/cc |
| Apparent density*** | 3.1-4.8 g/cc |
| Minimum $d_{pore,\ 90\%\ volume}$**** | 50 nm-50 μm |
| Minimum $d_{pore,\ 50\%\ surface\ area}$***** | 1 nm-10 μm |
| Total Fe (wt %)# | 81.8-89.2% |
| Metallic Fe (wt %)## | 68.7-83.2% |
| Metallization (%)### | 84-95% |
| Carbon (wt %)#### | 0.03-0.35% |
| $Fe^{2+}$ (wt %)##### | 2-8.7% |
| $Fe^{3+}$ (wt %)$ | 0.9-5.2% |
| $SiO_2$ (wt %)$$ | 3-7% |
| Ferrite (wt %, XRD)$$$ | 80-96% |
| Wustite (FeO, wt %, XRD)$$$$ | 2-13% |
| Goethite (FeOOH, wt %, XRD)$$$$$ | 0-11% |
| Cementite ($Fe_3C$, wt %, XRD)+ | 0-80% |

*Specific surface area preferably determined by the Brunauer-Emmett-Teller adsorption method ("BET"), and more preferably as the BET is set forth in ISO 9277 (the entire disclosure of which is incorporated herein by reference); recognizing that other tests, such as methylene blue (MB) staining, ethylene glycol monoethyl ether (EGME) adsorption, electrokinetic analysis of complex-ion adsorption' and a Protein Retention (PR) method may be employed to provide results that can be correlated with BET results.
**Actual density preferably determined by helium (He) pycnometry, and more preferably as is set forth in ISO 12154 (the entire disclosure of which is incorporated herein by reference); recognizing that other tests may be employed to provide results that can be correlated with He pycnometry results.
Actual density may also be referred to as "true density" or "skeletal density" in the art.
***Apparent density preferably determined by immersion in water, and more preferably as is set forth in ISO 15968 (the entire disclosure of which is incorporated herein by reference); recognizing that other tests may be employed to provide results that can be correlated with He pycnometry results.
Porosity may be defined as the ratio of apparent density to actual density:

$$Porosity = \frac{apparent\ density}{actual\ density}$$

****$d_{pore,\ 90\%\ volume}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results.
$d_{pore,\ 90\%\ volume}$ is the pore diameter above which 90% of the total pore volume exists.
*****$d_{pore,\ 50\%\ surface\ area}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results.
$d_{pore,\ 50\%\ surface\ area}$ is the pore diameter above which 50% of free surface area exists.
Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.
Metallic Fe (wt %) preferably determined by iron(III) chloride titrimetry, and more preferably as is set forth in ISO 16878 (the entire disclosure of which is incorporated herein by reference); recognizing that other tests, such as bromine-methanol titimetry, may be employed to provide results that can be correlated with iron(III) chloride titrimetry.
Metallization (%) preferably determined by the ratio of metallic Fe to total Fe, each as preferably determined by the methods previously described.
Carbon (wt %) preferably determined by infrared absorption after combustion in an induction furnace, and more preferably as is set forth in ISO 9556 (the entire disclosure of which is incorporated herein by reference); recognizing that other tests, such as various combustion and inert gas fusion techniques, such as are described in ASTM E1019-18 may be employed to provide results that can be correlated with infrared absorption after combustion in an induction furnace.
$Fe^{2+}$ (wt %) preferably determined by titrimetry, and more preferably as is set forth in ASTM D3872-05 (the entire disclosure of which is incorporated herein by reference); recognizing that other tests, such as Mossbauer spectroscopy, X-ray absorption spectroscopy, etc., may be employed to provide results that can be correlated with titrimetry.
$Fe^{3+}$ (wt %) preferably determined by the mass balance relation between and among Total Fe (wt %), Metallic Fe (wt %), $Fe^{2+}$ (wt %) and $Fe^{3+}$ (wt %).
Specifically the equality Total Fe (wt %) = Metallic Fe (wt %) + $Fe^{2+}$ (wt %) + $Fe^{3+}$ (wt %) must be true by conservation of mass, so $Fe^{3+}$ (wt %) may be calculated as $Fe^{3+}$ (wt %) = Total Fe (wt %) − Metallic Fe (wt %) − $Fe^{2+}$ (wt %).
$$$SiO_2$ (wt %) preferably determined by gravimetric methods, and more preferably as is set forth in ISO 2598-1 (the entire disclosure of which is incorporated herein by reference); recognizing that other tests, such as reduced molybdosilicate spectrophotometric methods, x-ray diffraction (XRD), may be employed to provide results that can be correlated with gravimetric methods.
In certain methods, the $SiO_2$ wt % is not determined directly, but rather the Si concentration (inclusive of neutral and ionic species) is measured, and the $SiO_2$ wt % is calculated assuming the stoichiometry of $SiO_2$; that is, a 1:2 molar ratio of Si:O is assumed.
$$$Ferrite (wt %, XRD) preferably determined by x-ray diffraction (XRD).
$$$$Wustite (FeO, wt %, XRD) preferably determined by x-ray diffraction (XRD).
$$$$$Goethite (FeOOH, wt %, XRD) preferably determined by x-ray diffraction (XRD).
+Cementite ($Fe_3C$, wt %, XRD) preferably determined by x-ray diffraction (XRD).

The properties set forth in Table 2, may also be present in embodiments with, in addition to, or instead of the properties in Tables 1 and/or 1A. Greater and lesser values for these properties may also be present in various embodiments.

In certain embodiments the DRI may be produced by the reduction of a DR Grade pellet, in which case the resulting DRI may have material properties as described in Table 3 below. The use of reduced DR grade DRI may be advantageous due to the higher Fe content in the pellet which increases the energy density of the battery.

TABLE 3

| Material Property | Embodiment Range |
|---|---|
| Specific surface area* | 0.21-25 m²/g as received or 0.19-25 m²/g after performing a pre-change formation step |
| Actual density** | 4.6-7.1 g/cc |
| Apparent density*** | 2.3-5.7 g/cc |
| Minimum $d_{pore,\ 90\%\ volume}$**** | 50 nm-50 μm |
| Minimum $d_{pore,\ 50\%\ surface\ area}$***** | 1 nm-10 μm |
| Total Fe (wt %)# | 80-94% |
| Metallic Fe (wt %)## | 64-94% |
| Metallization (%)### | 80-100% |
| Carbon (wt %)#### | 0-5% |
| $Fe^{2+}$ (wt %)##### | 0-8% |
| $Fe^{3+}$ (wt %)$ | 0-10% |
| $SiO_2$ (wt %)$$ | 1-4% |
| Ferrite (wt %, XRD)$$$ | 22-80% |
| Wustite (FeO, wt %, XRD)$$$$ | 0-13% |
| Goethite (FeOOH, wt %, XRD)$$$$$ | 0-23% |
| Cementite ($Fe_3C$, wt %, XRD)+ | «80% |

*Specific surface area preferably determined by the Brunauer-Emmett-Teller adsorption method ("BET"), and more preferably as the BET is set forth in ISO 9277 (the entire disclosure of which is incorporated herein by reference); recognizing that other tests, such as methylene blue (MB) staining, ethylene glycol monoethyl ether (EGME) adsorption, electrokinetic analysis of complex-ion adsorption' and a Protein Retention (PR) method may be employed to provide results that can be correlated with BET results.
**Actual density preferably determined by helium (He) pycnometry, and more preferably as is set forth in ISO 12154 (the entire disclosure of which is incorporated herein by reference); recognizing that other tests may be employed to provide results that can be correlated with He pycnometry results.
Actual density may also be referred to as "true density" or "skeletal density" in the art.
***Apparent density preferably determined by immersion in water, and more preferably as is set forth in ISO 15968 (the entire disclosure of which is incorporated herein by reference); recognizing that other tests may be employed to provide results that can be correlated with He pycnometry results.
Porosity may be defined as the ratio of apparent density to actual density:

$$Porosity = \frac{apparent\ density}{actual\ density}$$

****$d_{pore,\ 90\%\ volume}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results.
$d_{pore,\ 90\%\ volume}$ is the pore diameter above which 90% of the total pore volume exists.

TABLE 3-continued

| Material Property | Embodiment Range |
| --- | --- |

***** $d_{pore,\ 50\%\ surface\ area}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. $d_{pore,\ 50\%\ surface\ area}$ is the pore diameter above which 50% of free surface area exists.
Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.
Metallic Fe (wt %) preferably determined by iron(III) chloride titrimetry, and more preferably as is set forth in ISO 16878 (the entire disclosure of which is incorporated herein by reference); recognizing that other tests, such as bromine-methanol titimetry, may be employed to provide results that can be correlated with iron(III) chloride titrimetry.
Metallization (%) preferably determined by the ratio of metallic Fe to total Fe, each as preferably determined by the methods previously described.
Carbon (wt %) preferably determined by infrared absorption after combustion in an induction furnace, and more preferably as is set forth in ISO 9556 (the entire disclosure of which is incorporated herein by reference); recognizing that other tests, such as various combustion and inert gas fusion techniques, such as are described in ASTM E1019-18 may be employed to provide results that can be correlated with infrared absorption after combustion in an induction furnace.
$Fe^{2+}$ (wt %) preferably determined by titrimetry, and more preferably as is set forth in ASTM D3872-05 (the entire disclosure of which is incorporated herein by reference); recognizing that other tests, such as Mossbauer spectroscopy, X-ray absorption spectroscopy, etc., may be employed to provide results that can be correlated with titrimetry.
$Fe^{3+}$ (wt %) preferably determined by the mass balance relation between and among Total Fe (wt %), Metallic Fe (wt %), $Fe^{2+}$ (wt %) and $Fe^{3+}$ (wt %).
Specifically the equality Total Fe (wt %) = Metallic Fe (wt %) + $Fe^{2+}$ (wt %) + $Fe^{3+}$ (wt %) must be true by conservation of mass, so $Fe^{3+}$ (wt %) may be calculated as $Fe^{3+}$ (wt %) = Total Fe (wt %) − Metallic Fe (wt %) − $Fe^{2+}$ (wt %).
$$SiO_2 (wt %) preferably determined by gravimetric methods, and more preferably as is set forth in ISO 2598-1 (the entire disclosure of which is incorporated herein by reference); recognizing that other tests, such as reduced molybdosilicate spectrophotometric methods, x-ray diffraction (XRD), may be employed to provide results that can be correlated with gravimetric methods.
In certain methods, the $SiO_2$ wt % is not determined directly, but rather the Si concentration (inclusive of neutral and ionic species) is measured, and the $SiO_2$ wt % is calculated assuming the stoichiometry of $SiO_2$; that is, a 1:2 molar ratio of Si:O is assumed.
$$$Ferrite (wt %, XRD) preferably determined by x-ray diffraction (XRD).
$$$$Wustite (FeO, wt %, XRD) preferably determined by x-ray diffraction (XRD).
$$$$$Goethite (FeOOH, wt %, XRD) preferably determined by x-ray diffraction (XRD).
†Cementite ($Fe_3C$, wt %, XRD) preferably determined by x-ray diffraction (XRD).

The properties set forth in Table 3, may also be present in embodiments with, in addition to, or instead of the properties in Tables 1, 1A, and/or 2. Greater and lesser values for these properties may also be present in various embodiments.

Various embodiments may provide devices and/or methods for use in bulk energy storage systems, such as long duration energy storage (LODES) systems, short duration energy storage (SDES) systems, etc. As an example, various embodiments may provide batteries for bulk energy storage systems, such as batteries for LODES systems. Renewable power sources are becoming more prevalent and cost effective. However, many renewable power sources face an intermittency problem that is hindering renewable power source adoption. The impact of the intermittent tendencies of renewable power sources may be mitigated by pairing renewable power sources with bulk energy storage systems, such as LODES systems, SDES systems, etc. To support the adoption of combined power generation, transmission, and storage systems (e.g., a power plant having a renewable power generation source paired with a bulk energy storage system and transmission facilities at any of the power plant and/or the bulk energy storage system) devices and methods to support the design and operation of such combined power generation, transmission, and storage systems, such as the various embodiment devices and methods described herein, are needed.

A combined power generation, transmission, and storage system may be a power plant including one or more power generation sources (e.g., one or more renewable power generation sources, one or more non-renewable power generations sources, combinations of renewable and non-renewable power generation sources, etc.), one or more transmission facilities, and one or more bulk energy storage systems. Transmission facilities at any of the power plant and/or the bulk energy storage systems may be co-optimized with the power generation and storage system or may impose constraints on the power generation and storage system design and operation. The combined power generation, transmission, and storage systems may be configured to meet various output goals, under various design and operating constraints.

FIGS. 3-11 illustrate various example systems in which one or more aspects of the various embodiments may be used as part of bulk energy storage systems, such as LODES systems, SDES systems, etc. For example, various embodiments described herein with reference to FIG. 1A may be used as batteries for bulk energy storage systems, such as LODES systems, SDES systems, etc. and/or various electrodes as described herein may be used as components for bulk energy storage systems. Additionally, various embodiments, such as the embodiments methods described herein, especially with reference to FIGS. 1B, 1C, 2A, and 2B, may be used to recycle, repurpose, and/or reuse components of bulk energy storage systems. As used herein, the term "LODES system" may mean a bulk energy storage system configured to may have a rated duration (energy/power ratio) of 24 hours (h) or greater, such as a duration of 24 h, a duration of 24 h to 50 h, a duration of greater than 50 h, a duration of 24 h to 150 h, a duration of greater than 150 h, a duration of 24 h to 200 h, a duration greater than 200 h, a duration of 24 h to 500 h, a duration greater than 500 h, etc.

Figure 3:
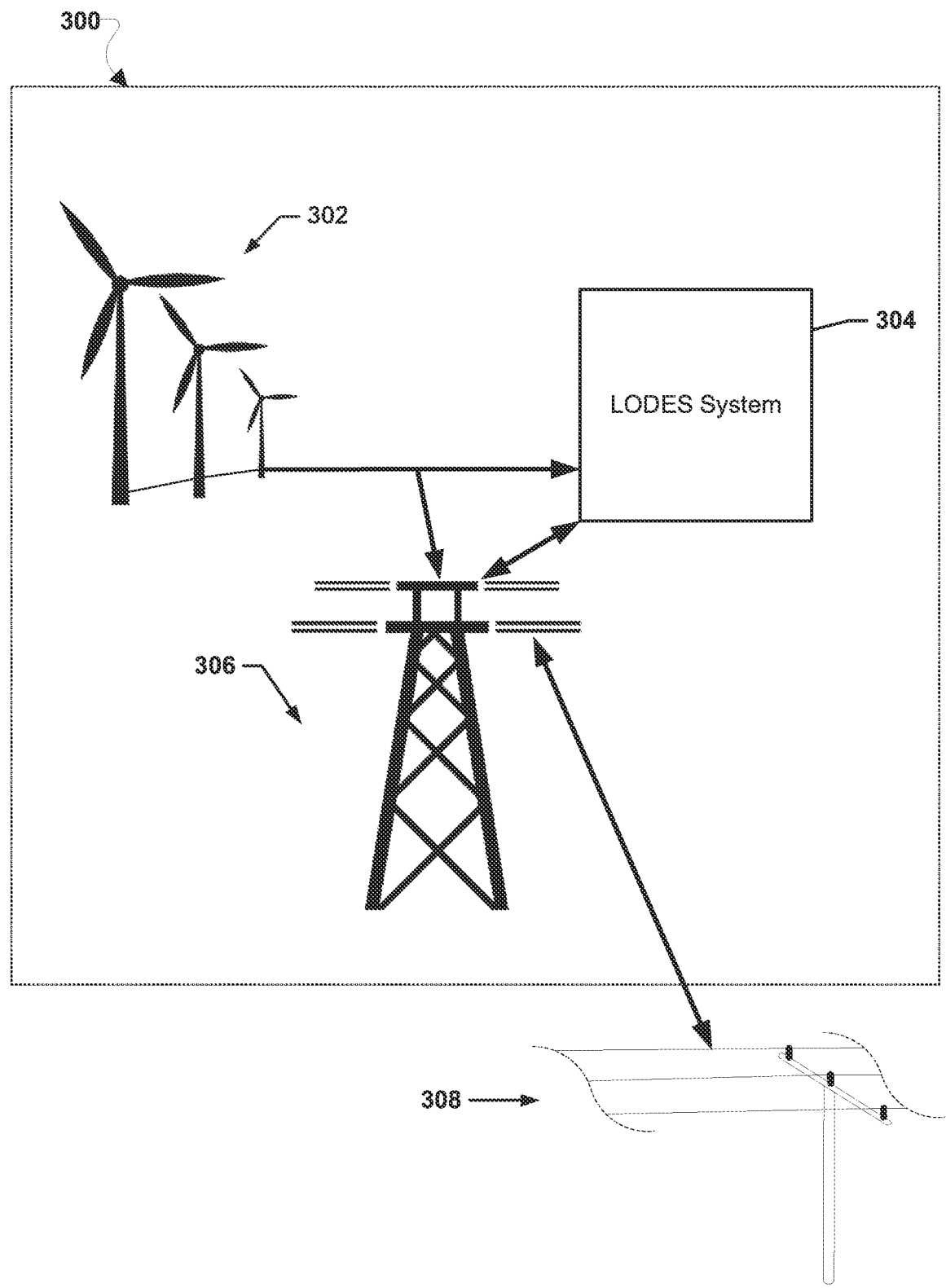
FIGS. 3-11 illustrate various example systems in which one or more aspects of the various embodiments may be used as part of bulk energy storage systems.

FIG. 3 illustrates an example system in which one or more aspects of the various embodiments may be used as part of bulk energy storage system. As a specific example, the bulk energy storage system incorporating one or more aspects of the various embodiments may be a LODES system 304. As an example, the LODES system 304 may include various embodiment batteries described herein, various electrodes described herein, etc., and/or the LODES system 304 and/or its components, may be recycled, repurposed, and/or reused as described herein. The LODES system 304 may be electrically connected to a wind farm 302 and one or more transmission facilities 306. The wind farm 302 may be electrically connected to the transmission facilities 306. The transmission facilities 306 may be electrically connected to the grid 308. The wind farm 302 may generate power and the wind farm 302 may output generated power to the LODES system 304 and/or the transmission facilities 306. The LODES system 304 may store power received from the wind farm 302 and/or the transmission facilities 306. The LODES system 304 may output stored power to the transmission facilities 306. The transmission facilities 306 may output power received from one or both of the wind farm 302 and LODES system 304 to the grid 308 and/or may receive power from the grid 308 and output that power to the LODES system 304. Together the wind farm 302, the LODES system 304, and the transmission facilities 306 may constitute a power plant 300 that may be a combined power generation, transmission, and storage system. The power generated by the wind farm 302 may be directly fed to the grid 308 through the transmission facilities 306, or may be first stored in the LODES system 304. In certain cases the power supplied to the grid 308 may come entirely from the wind farm 302, entirely from the LODES system 304, or from a combination of the wind farm 302 and the LODES system 304. The dispatch of power from the combined wind farm 302 and LODES system 304 power plant 300 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 300, the LODES system 304 may be used to reshape and "firm" the power produced by the wind farm 302. In one such example, the wind farm 302 may have a peak generation output (capacity) of 260 megawatts (MW) and a capacity factor (CF) of 41%. The LODES system 304 may have a power rating (capacity) of 106 MW, a rated duration (energy/power ratio) of 150 hours (h), and an energy rating of 15,900 megawatt hours (MWh). In another such example, the wind farm 302 may have a peak generation output (capacity) of 300 MW and a capacity factor (CF) of 41%. The LODES system 304 may have a power rating of 106 MW, a rated duration (energy/power ratio) of 200 h and an energy rating of 21,200 MWh. In another such example, the wind farm 302 may have a peak generation output (capacity) of 176 MW and a capacity factor (CF) of 53%. The LODES system 304 may have a power rating (capacity) of 88 MW, a rated duration (energy/power ratio) of 150 h and an energy rating of 13,200 MWh. In another such example, the wind farm 302 may have a peak generation output (capacity) of 277 MW and a capacity factor (CF) of 41%. The LODES system 304 may have a power rating (capacity) of 97 MW, a rated duration (energy/power ratio) of 50 h and an energy rating of 4,850 MWh. In another such example, the wind farm 302 may have a peak generation output (capacity) of 315 MW and a capacity factor (CF) of 41%. The LODES system 304 may have a power rating (capacity) of 110 MW, a rated duration (energy/power ratio) of 25 h and an energy rating of 2,750 MWh.

Figure 4:
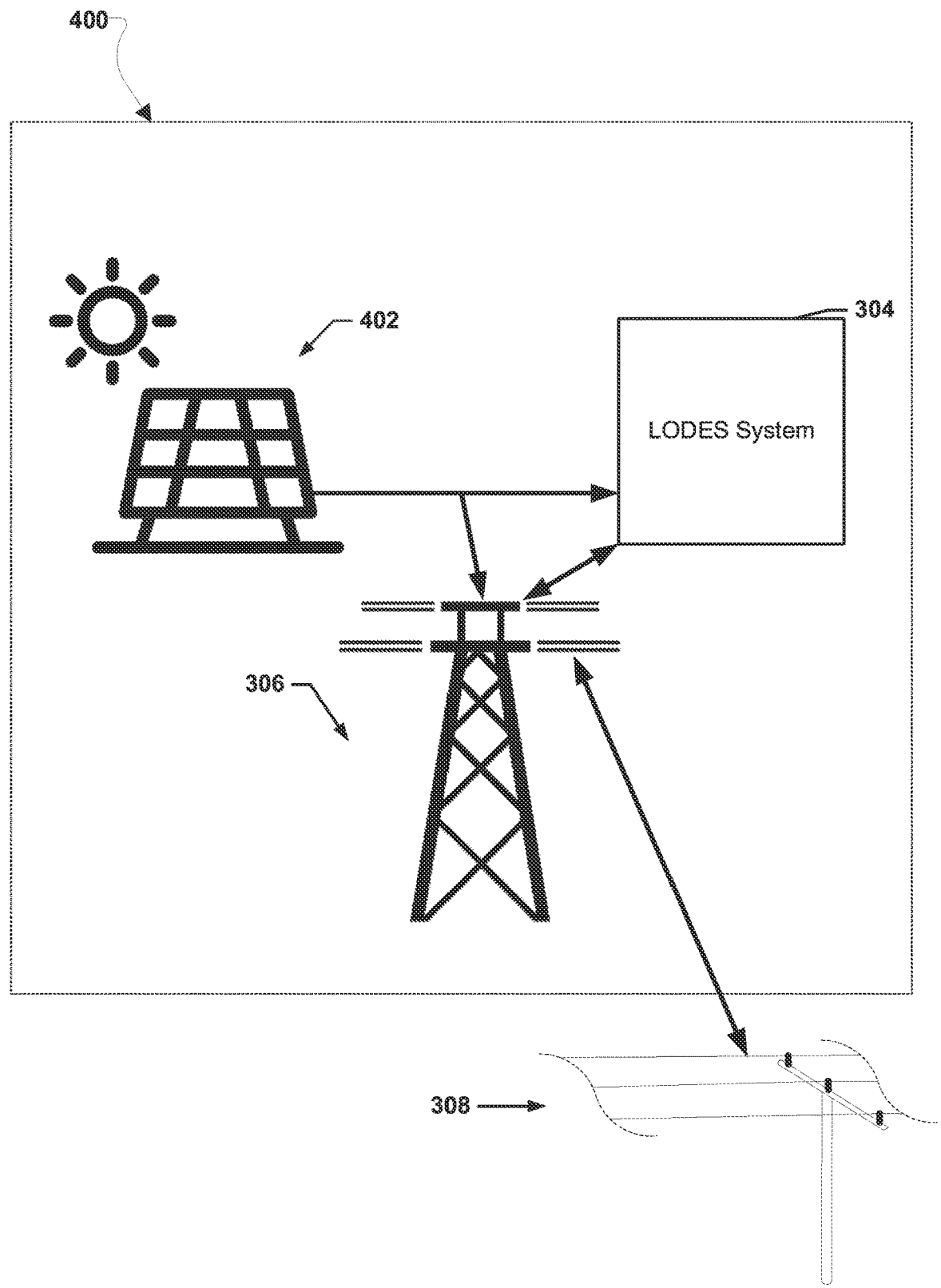

FIG. 4 illustrates an example system in which one or more aspects of the various embodiments may be used as part of bulk energy storage system. As a specific example, the bulk energy storage system incorporating one or more aspects of the various embodiments may be a LODES system 304. As an example, the LODES system 304 may include various embodiment batteries described herein, various electrodes described herein, etc., and/or the LODES system 304 and/or its components, may be recycled, repurposed, and/or reused as described herein. The system of FIG. 4 may be similar to the system of FIG. 3, except a photovoltaic (PV) farm 402 may be substituted for the wind farm 302. The LODES system 304 may be electrically connected to the PV farm 402 and one or more transmission facilities 306. The PV farm 402 may be electrically connected to the transmission facilities 306. The transmission facilities 306 may be electrically connected to the grid 308. The PV farm 402 may generate power and the PV farm 402 may output generated power to the LODES system 304 and/or the transmission facilities 306. The LODES system 304 may store power received from the PV farm 402 and/or the transmission facilities 306. The LODES system 304 may output stored power to the transmission facilities 306. The transmission facilities 306 may output power received from one or both of the PV farm 402 and LODES system 304 to the grid 308 and/or may receive power from the grid 308 and output that power to the LODES system 304. Together the PV farm 402, the LODES system 304, and the transmission facilities 306 may constitute a power plant 400 that may be a combined power generation, transmission, and storage system. The power generated by the PV farm 402 may be directly fed to the grid 308 through the transmission facilities 306, or may be first stored in the LODES system 304. In certain cases the power supplied to the grid 308 may come entirely from the PV farm 402, entirely from the LODES system 304, or from a combination of the PV farm 402 and the LODES system 304. The dispatch of power from the combined PV farm 402 and LODES system 304 power plant 400 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 400, the LODES system 304 may be used to reshape and "firm" the power produced by the PV farm 402. In one such example, the PV farm 402 may have a peak generation output (capacity) of 490 MW and a capacity factor (CF) of 24%. The LODES system 304 may have a power rating (capacity) of 340 MW, a rated duration (energy/power ratio) of 150 h and an energy rating of 51,000 MWh. In another such example, the PV farm 402 may have a peak generation output (capacity) of 680 MW and a capacity factor (CF) of 24%. The LODES system 304 may have a power rating (capacity) of 410 MW, a rated duration (energy/power ratio) of 200 h, and an energy rating of 82,000 MWh. In another such example, the PV farm 402 may have a peak generation output (capacity) of 330 MW and a capacity factor (CF) of 31%. The LODES system 304 may have a power rating (capacity) of 215 MW, a rated duration (energy/power ratio) of 150 h, and an energy rating of 32,250 MWh. In another such example, the PV farm 402 may have a peak generation output (capacity) of 510 MW and a capacity factor (CF) of 24%. The LODES system 304 may have a power rating (capacity) of 380 MW, a rated duration (energy/power ratio) of 50 h, and an energy rating of 19,000 MWh. In another such example, the PV farm 402 may have a peak generation output (capacity) of 630 MW and a capacity factor (CF) of 24%. The LODES system 304 may have a power rating (capacity) of 380 MW, a rated duration (energy/power ratio) of 25 h, and an energy rating of 9,500 MWh.

Figure 5:
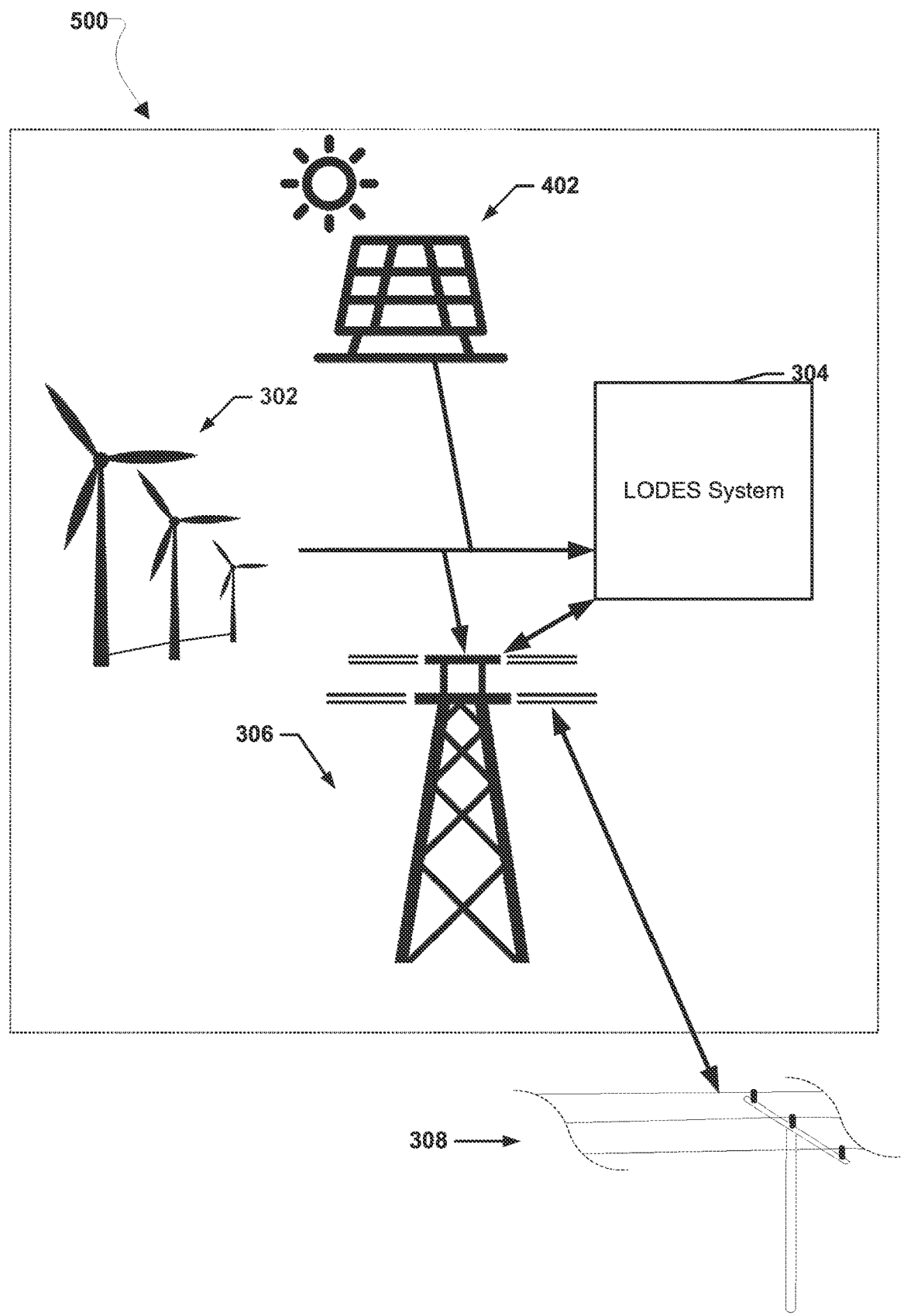

FIG. 5 illustrates an example system in which one or more aspects of the various embodiments may be used as part of bulk energy storage system. As a specific example, the bulk energy storage system incorporating one or more aspects of the various embodiments may be a LODES system 304. As an example, the LODES system 304 may include various embodiment batteries described herein, various electrodes described herein, etc., and/or the LODES system 304 and/or its components, may be recycled, repurposed, and/or reused as described herein. The system of FIG. 5 may be similar to the systems of FIGS. 3 and 4, except the wind farm 302 and the photovoltaic (PV) farm 402 may both be power generators working together in the power plant 500. Together the PV farm 402, wind farm 302, the LODES system 304, and the transmission facilities 306 may constitute the power plant 500 that may be a combined power generation, transmission, and storage system. The power generated by the PV farm 402 and/or the wind farm 302 may be directly fed to the grid 308 through the transmission facilities 306, or may be first stored in the LODES system 304. In certain cases the power supplied to the grid 308 may come entirely from the PV farm 402, entirely from the wind farm 302, entirely from the LODES system 304, or from a combination of the PV farm 402, the wind farm 302, and the LODES system 304. The dispatch of power from the combined wind farm 302, PV farm 402, and LODES system 304 power plant 500 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 500, the LODES system 304 may be used to reshape and "firm" the power produced by the wind farm 302 and the PV farm 402.

In one such example, the wind farm 302 may have a peak generation output (capacity) of 126 MW and a capacity factor (CF) of 41% and the PV farm 402 may have a peak generation output (capacity) of 126 MW and a capacity factor (CF) of 24%. The LODES system 304 may have a power rating (capacity) of 63 MW, a rated duration (energy/power ratio) of 150 h, and an energy rating of 9,450 MWh. In another such example, the wind farm 302 may have a peak generation output (capacity) of 170 MW and a capacity factor (CF) of 41% and the PV farm 402 may have a peak generation output (capacity) of 110 MW and a capacity factor (CF) of 24%. The LODES system 304 may have a power rating (capacity) of 57 MW, a rated duration (energy/power ratio) of 200 h, and an energy rating of 11,400 MWh. In another such example, the wind farm 302 may have a peak generation output (capacity) of 105 MW and a capacity factor (CF) of 51% and the PV farm 402 may have a peak generation output (capacity) of 70 MW and a capacity factor (CF) of 31 The LODES system 304 may have a power rating (capacity) of 61 MW, a rated duration (energy/power ratio) of 150 h, and an energy rating of 9,150 MWh. In another such example, the wind farm 302 may have a peak generation output (capacity) of 135 MW and a capacity factor (CF) of 41% and the PV farm 402 may have a peak generation output (capacity) of 90 MW and a capacity factor (CF) of 24%. The LODES system 304 may have a power rating (capacity) of 68 MW, a rated duration (energy/power ratio) of 50 h, and an energy rating of 3,400 MWh. In another such example, the wind farm 302 may have a peak generation output (capacity) of 144 MW and a capacity factor (CF) of 41% and the PV farm 402 may have a peak generation output (capacity) of 96 MW and a capacity factor (CF) of 24%. The LODES system 304 may have a power rating (capacity) of 72 MW, a rated duration (energy/power ratio) of 25 h, and an energy rating of 1,800 MWh.

Figure 6:
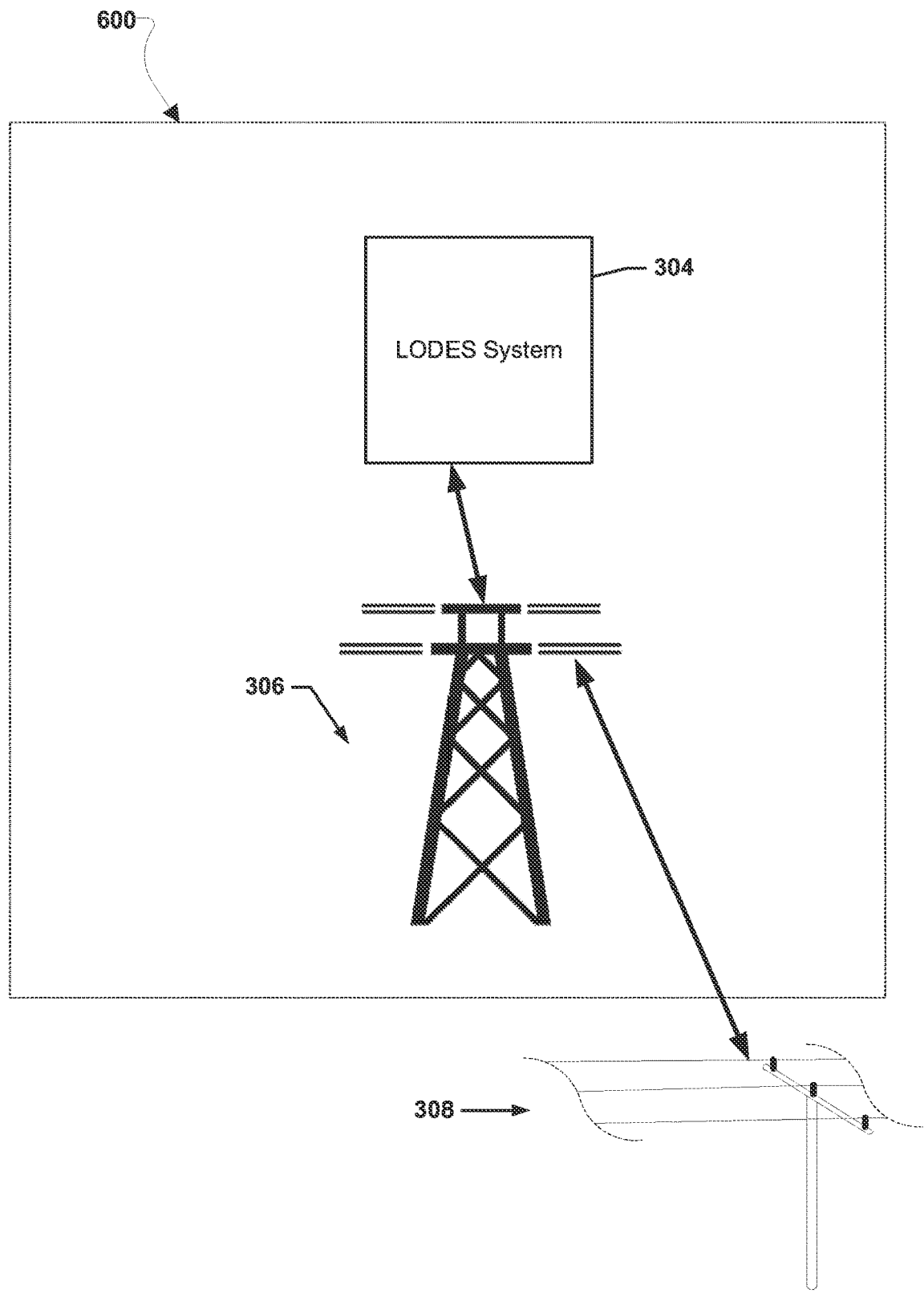

FIG. 6 illustrates an example system in which one or more aspects of the various embodiments may be used as part of bulk energy storage system. As a specific example, the bulk energy storage system incorporating one or more aspects of the various embodiments may be a LODES system 304. As an example, the LODES system 304 may include various embodiment batteries described herein, various electrodes described herein, etc., and/or the LODES system 304 and/or its components, may be recycled, repurposed, and/or reused as described herein. The LODES system 304 may be electrically connected to one or more transmission facilities 306. In this manner, the LODES system 304 may operate in a "stand-alone" manner to arbiter energy around market prices and/or to avoid transmission constraints. The LODES system 304 may be electrically connected to one or more transmission facilities 306. The transmission facilities 306 may be electrically connected to the grid 308. The LODES system 304 may store power received from the transmission facilities 306. The LODES system 304 may output stored power to the transmission facilities 306. The transmission facilities 306 may output power received from the LODES system 304 to the grid 308 and/or may receive power from the grid 308 and output that power to the LODES system 304.

Together the LODES system 304 and the transmission facilities 306 may constitute a power plant 900. As an example, the power plant 900 may be situated downstream of a transmission constraint, close to electrical consumption. In such an example downstream situated power plant 600, the LODES system 304 may have a duration of 24 h to 500 h and may undergo one or more full discharges a year to support peak electrical consumptions at times when the transmission capacity is not sufficient to serve customers. Additionally in such an example downstream situated power plant 600, the LODES system 304 may undergo several shallow discharges (daily or at higher frequency) to arbiter the difference between nighttime and daytime electricity prices and reduce the overall cost of electrical service to customer. As a further example, the power plant 600 may be situated upstream of a transmission constraint, close to electrical generation. In such an example upstream situated power plant 600, the LODES system 304 may have a duration of 24 h to 500 h and may undergo one or more full charges a year to absorb excess generation at times when the transmission capacity is not sufficient to distribute the electricity to customers. Additionally in such an example upstream situated power plant 600, the LODES system 304 may undergo several shallow charges and discharges (daily or at higher frequency) to arbiter the difference between nighttime and daytime electricity prices and maximize the value of the output of the generation facilities.

Figure 7:
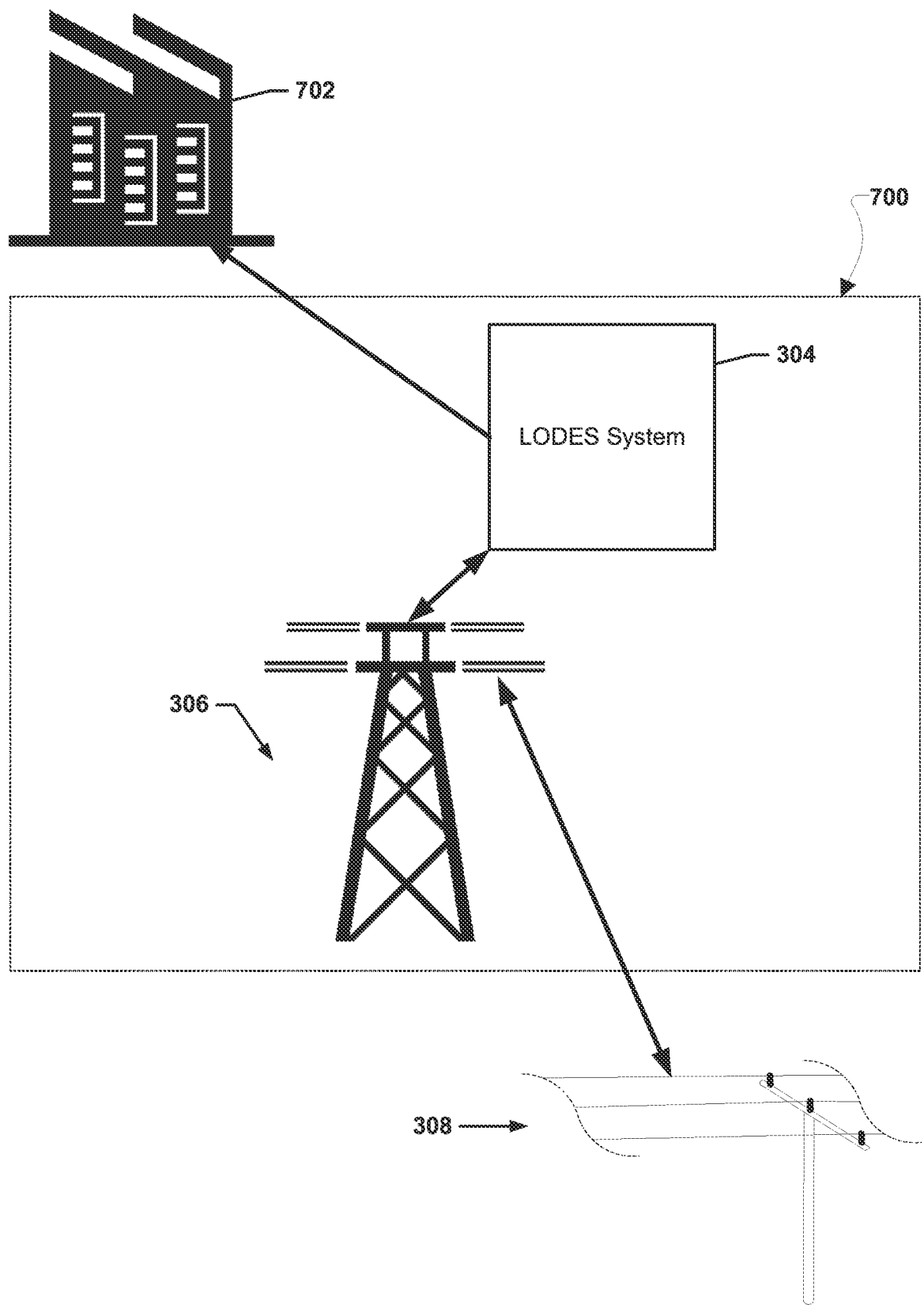

FIG. 7 illustrates an example system in which one or more aspects of the various embodiments may be used as part of bulk energy storage system. As a specific example, the bulk energy storage system incorporating one or more aspects of the various embodiments may be a LODES system 304. As an example, the LODES system 304 may include various embodiment batteries described herein, various electrodes described herein, etc., and/or the LODES system 304 and/or its components, may be recycled, repurposed, and/or reused as described herein. The LODES system 304 may be electrically connected to a commercial and industrial (C & I) customer 702, such as a data center, factory, etc. The LODES system 304 may be electrically connected to one or more transmission facilities 306. The transmission facilities 306 may be electrically connected to the grid 308. The transmission facilities 306 may receive power from the grid 308 and output that power to the LODES system 304. The LODES system 304 may store power received from the transmission facilities 306. The LODES system 304 may output stored power to the C & I customer 702. In this manner, the LODES system 304 may operate to reshape electricity purchased from the grid 308 to match the consumption pattern of the C & I customer 702.

Together, the LODES system 304 and transmission facilities 306 may constitute a power plant 700. As an example, the power plant 700 may be situated close to electrical consumption, i.e., close to the C & I customer 702, such as between the grid 308 and the C & I customer 702. In such an example, the LODES system 304 may have a duration of 24 h to 500 h and may buy electricity from the markets and thereby charge the LODES system 304 at times when the electricity is cheaper. The LODES system 304 may then discharge to provide the C & I customer 702 with electricity at times when the market price is expensive, therefore offsetting the market purchases of the C & I customer 702. As an alternative configuration, rather than being situated between the grid 308 and the C & I customer 702, the power plant 700 may be situated between a renewable source, such as a PV farm, wind farm, etc., and the transmission facilities 306 may connect to the renewable source. In such an alternative example, the LODES system 304 may have a duration of 24 h to 500 h, and the LODES system 304 may charge at times when renewable output may be available. The LODES system 304 may then discharge to provide the C & I customer 702 with renewable generated electricity so as to cover a portion, or the entirety, of the C & I customer 702 electricity needs.

Figure 8:
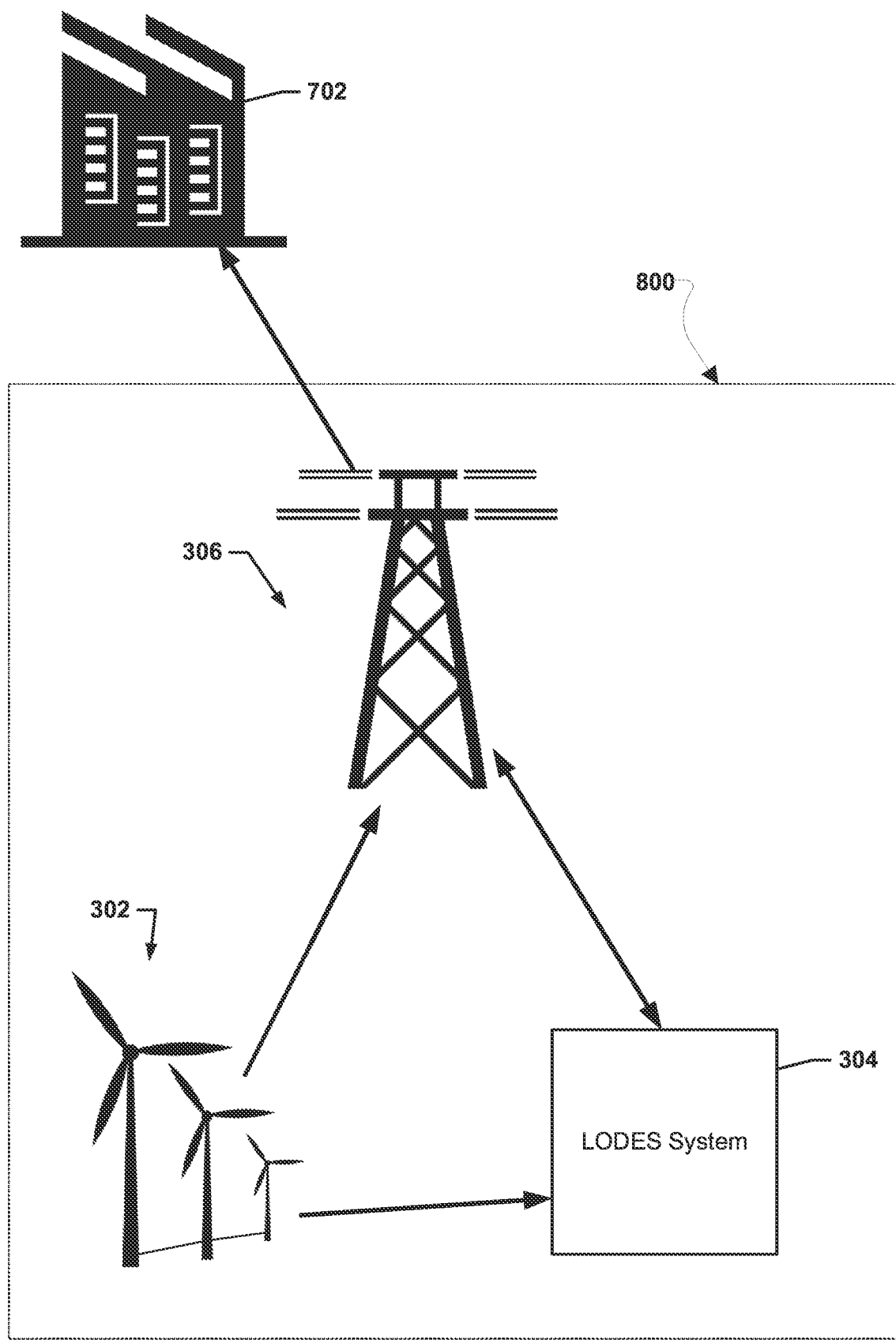

FIG. 8 illustrates an example system in which one or more aspects of the various embodiments may be used as part of bulk energy storage system. As a specific example, the bulk energy storage system incorporating one or more aspects of the various embodiments may be a LODES system 304. As an example, the LODES system 304 may include various embodiment batteries described herein, various electrodes described herein, etc., and/or the LODES system 304 and/or its components, may be recycled, repurposed, and/or reused as described herein. The LODES system 304 may be electrically connected to a wind farm 302 and one or more transmission facilities 306. The wind farm 302 may be electrically connected to the transmission facilities 306. The transmission facilities 306 may be electrically connected to a C & I customer 702. The wind farm 302 may generate power and the wind farm 302 may output generated power to the LODES system 304 and/or the transmission facilities 306. The LODES system 304 may store power received from the wind farm 302.

The LODES system 304 may output stored power to the transmission facilities 306. The transmission facilities 306 may output power received from one or both of the wind farm 302 and LODES system 304 to the C & I customer 702. Together the wind farm 302, the LODES system 304, and the transmission facilities 306 may constitute a power plant 800 that may be a combined power generation, transmission, and storage system. The power generated by the wind farm 302 may be directly fed to the C & I customer 702 through the transmission facilities 306, or may be first stored in the LODES system 304. In certain cases, the power supplied to the C & I customer 702 may come entirely from the wind farm 302, entirely from the LODES system 304, or from a combination of the wind farm 302 and the LODES system 304. The LODES system 304 may be used to reshape the electricity generated by the wind farm 302 to match the consumption pattern of the C & I customer 702. In one such example, the LODES system 304 may have a duration of 24 h to 500h and may charge when renewable generation by the wind farm 302 exceeds the C & I customer 702 load. The LODES system 304 may then discharge when renewable generation by the wind farm 302 falls short of C & I customer 702 load so as to provide the C & I customer 702 with a firm renewable profile that offsets a fraction, or all of, the C & I customer 702 electrical consumption.

Figure 9:
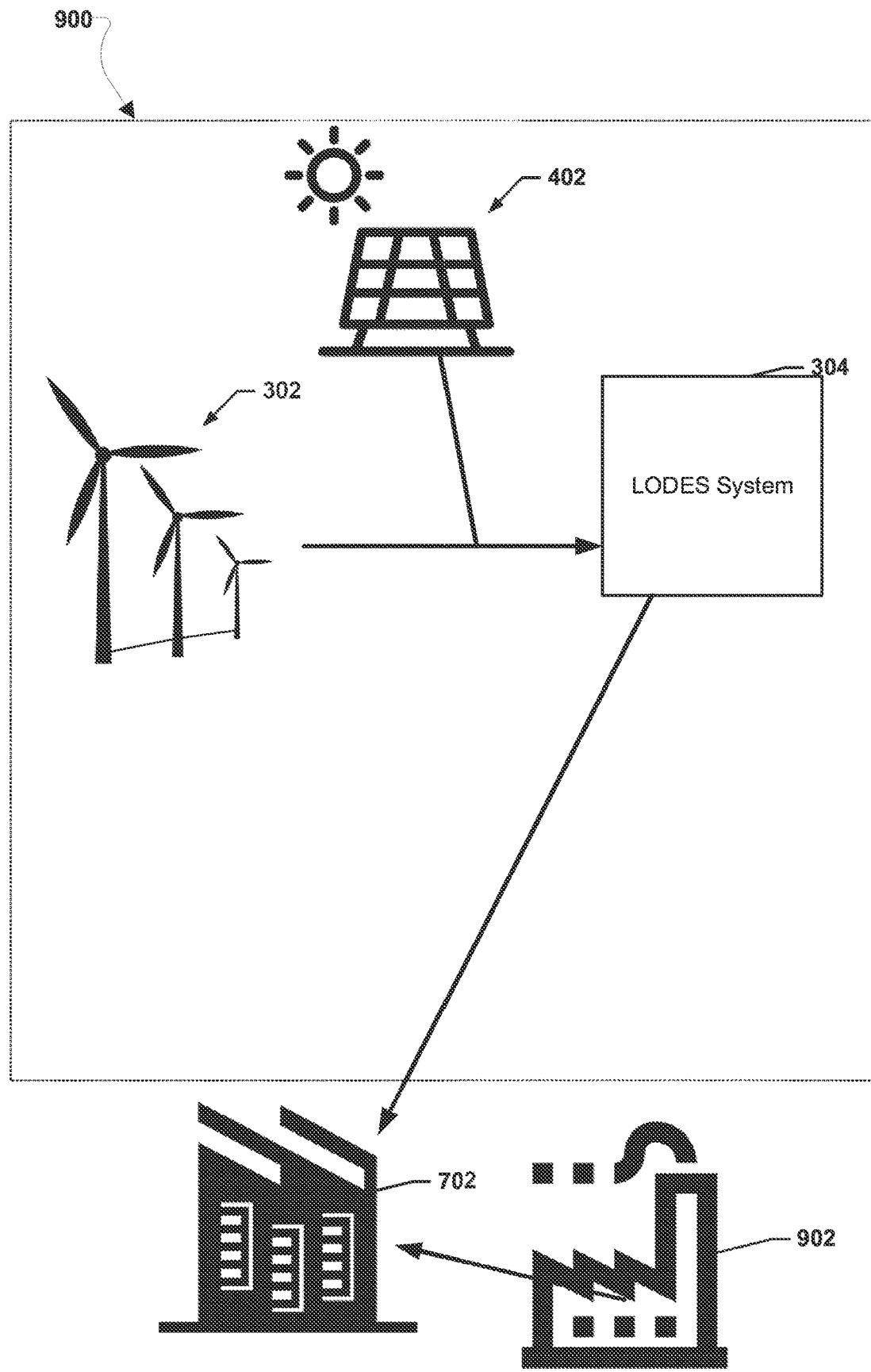

FIG. 9 illustrates an example system in which one or more aspects of the various embodiments may be used as part of bulk energy storage system. As a specific example, the bulk energy storage system incorporating one or more aspects of the various embodiments may be a LODES system 304. As an example, the LODES system 304 may include various embodiment batteries described herein, various electrodes described herein, etc., and/or the LODES system 304 and/or its components, may be recycled, repurposed, and/or reused as described herein. The LODES system 304 may be part of a power plant 900 that is used to integrate large amounts of renewable generation in microgrids and harmonize the output of renewable generation by, for example a PV farm 402 and wind farm 302, with existing thermal generation by, for example a thermal power plant 902 (e.g., a gas plant, a coal plant, a diesel generator set, etc., or a combination of thermal generation methods), while renewable generation and thermal generation supply the C & I customer 702 load at high availability. Microgrids, such as the microgrid constituted by the power plant 900 and the thermal power plant 902, may provide availability that is 90% or higher. The power generated by the PV farm 402 and/or the wind farm 302 may be directly fed to the C & I customer 702, or may be first stored in the LODES system 304.

In certain cases the power supplied to the C & I customer 702 may come entirely from the PV farm 402, entirely from the wind farm 302, entirely from the LODES system 304, entirely from the thermal power plant 902, or from any combination of the PV farm 402, the wind farm 302, the LODES system 304, and/or the thermal power plant 902. As examples, the LODES system 304 of the power plant 900 may have a duration of 24 h to 500 h. As a specific example, the C & I customer 702 load may have a peak of 100 MW, the LODES system 304 may have a power rating of 14 MW and duration of 150 h, natural gas may cost $6/million British thermal units (MMBTU), and the renewable penetration may be 58%. As another specific example, the C & I customer 702 load may have a peak of 100 MW, the LODES system 304 may have a power rating of 25 MW and duration of 150 h, natural gas may cost $8/MMBTU, and the renewable penetration may be 65%.

Figure 10:
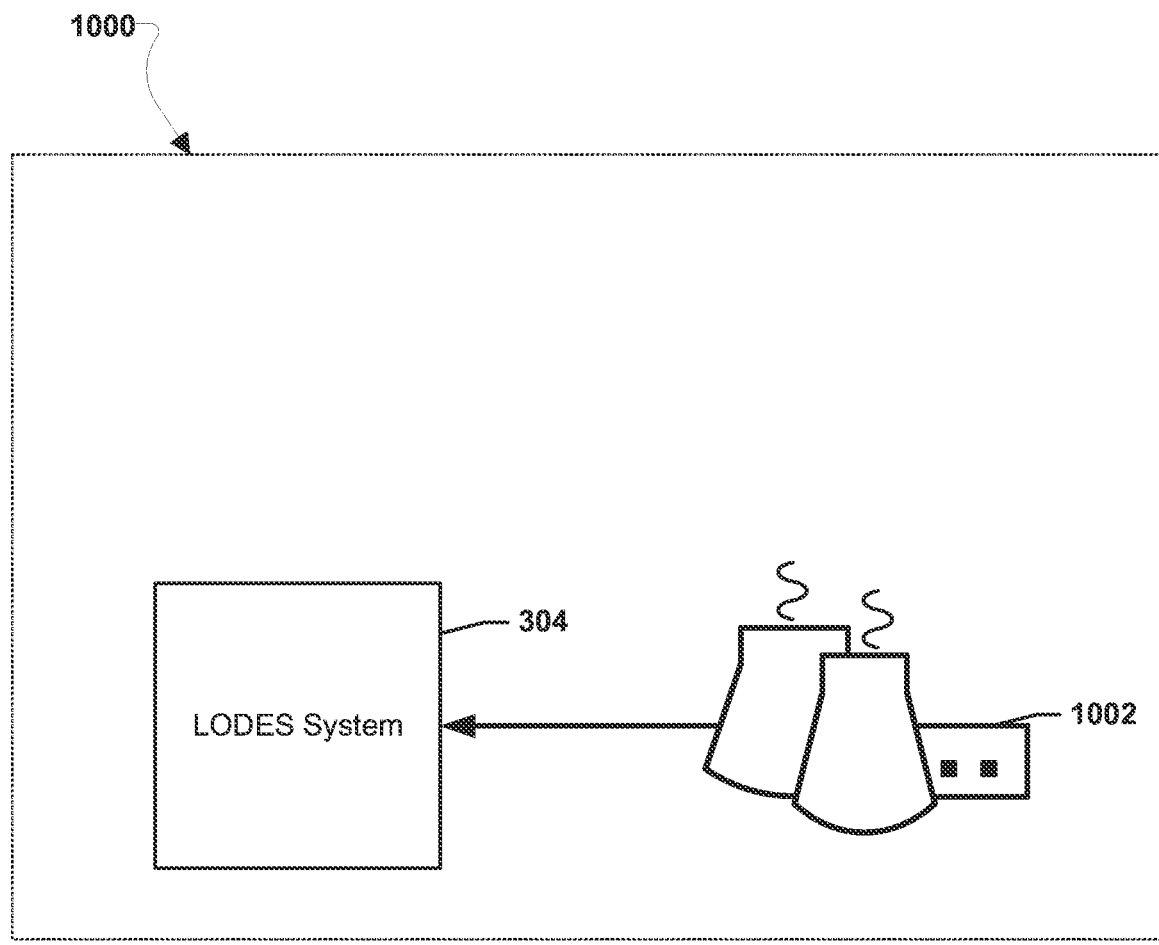

FIG. 10 illustrates an example system in which one or more aspects of the various embodiments may be used as part of bulk energy storage system. As a specific example, the bulk energy storage system incorporating one or more aspects of the various embodiments may be a LODES system 304. As an example, the LODES system 304 may include various embodiment batteries described herein, various electrodes described herein, etc. The LODES system 304 may be used to augment a nuclear plant 1002 (or other inflexible generation facility, such as a thermal, a biomass, etc., and/or any other type plant having a ramp-rate lower than 50% of rated power in one hour and a high capacity factor of 80% or higher) to add flexibility to the combined output of the power plant 1000 constituted by the combined LODES system 304 and nuclear plant 1002. The nuclear plant 1002 may operate at high capacity factor and at the highest efficiency point, while the LODES system 304 may charge and discharge to effectively reshape the output of the nuclear plant 1002 to match a customer electrical consumption and/or a market price of electricity. As examples, the LODES system 304 of the power plant 1000 may have a duration of 24 h to 500 h. In one specific example, the nuclear plant 1002 may have 1,000 MW of rated output and the nuclear plant 1002 may be forced into prolonged periods of minimum stable generation or even shutdowns because of depressed market pricing of electricity. The LODES system 304 may avoid facility shutdowns and charge at times of depressed market pricing; and the LODES system 304 may subsequently discharge and boost total output generation at times of inflated market pricing.

Figure 11:
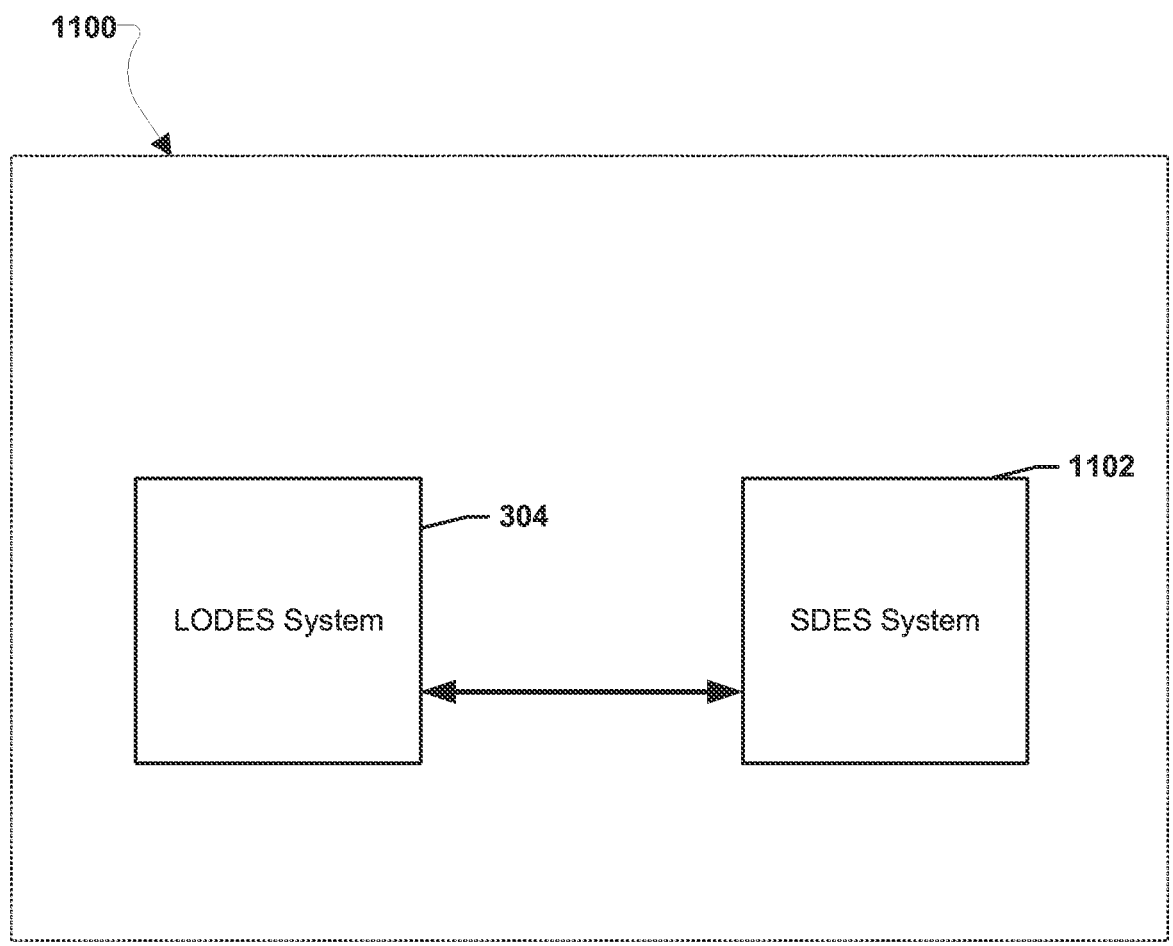

FIG. 11 illustrates an example system in which one or more aspects of the various embodiments may be used as part of bulk energy storage system. As a specific example, the bulk energy storage system incorporating one or more aspects of the various embodiments may be a LODES system 304. As an example, the LODES system 304 may include various embodiment batteries described herein, various electrodes described herein, etc., and/or the LODES system 304 and/or its components, may be recycled, repurposed, and/or reused as described herein. The LODES system 304 may operate in tandem with a SDES system 1102. Together the LODES system 304 and SDES system 1102 may constitute a power plant 1100. As an example, the LODES system 304 and SDES system 1102 may be co-optimized whereby the LODES system 304 may provide various services, including long-duration back-up and/or bridging through multi-day fluctuations (e.g., multi-day fluctuations in market pricing, renewable generation, electrical consumption, etc.), and the SDES system 1102 may provide various services, including fast ancillary services (e.g. voltage control, frequency regulation, etc.) and/or bridging through intra-day fluctuations (e.g., intra-day fluctuations in market pricing, renewable generation, electrical consumption, etc.). The SDES system 1102 may have durations of less than 10 hours and round-trip efficiencies of greater than 80%. The LODES system 304 may have durations of 24 h to 500 h and round-trip efficiencies of greater than 40%. In one such example, the LODES system 304 may have a duration of 150 hours and support customer electrical consumption for up to a week of renewable under-generation. The LODES system 304 may also support customer electrical consumption during intra-day under-generation events, augmenting the capabilities of the SDES system 1102. Further, the SDES system 1102 may supply customers during intra-day under-generation events and provide power conditioning and quality services such as voltage control and frequency regulation.

Various examples are provided below to illustrate aspects of the various embodiments. Example 1: A method, comprising: decommissioning an electrochemical system; and converting a metal electrode of the electrochemical system into a commodity metal. Example 2. The method of example 1, wherein the commodity metal is iron. Example 3. The method of example 2, wherein the commodity metal is direct reduced iron (DRI). Example 4. The method of any of examples 1-3, wherein converting a metal electrode of the electrochemical system into a commodity metal comprises pumping a solvent into the electrochemical system. Example 5. The method of example 4, wherein the solvent is an aqueous solution, saltwater, an alkaline solution, or an organic solvent. Example 6. The method of example 5, wherein the solvent causes an exothermic reaction used for heat in an energy plant. Example 7. The method of any of examples 1-3, wherein converting a metal electrode of the electrochemical system into a commodity metal comprises removing the metal electrode, drying the metal electrode and/or treating the metal electrode, and reducing and/or dissolving the metal. Example 8. The method of any of examples 1-3, wherein the spent metal electrode is used to form metal-based concrete. Example 9. A method of operating an electrochemical system including capturing side products and/or waste streams to capture additional value materials from the electrochemical system. Example 10. The method of example 9, wherein the additional value materials are commodity iron, high purity transition metal ores, fluoropolymer dispersions, various carbons, commodity chemicals, and catalyst dispersions. Example 11. A method comprising using a rechargeable alkaline manganese (RAM) cathode of an electrochemical system decay product, (i.e., $Mn_3O_4$), as an ORR catalyst in an air electrode. Example 12. A method comprising recapturing electrode materials from an electrochemical system including recycling bimetallic OER electrodes, treating a gas diffusion electrode to restore surface hydrophobicity, and/or separating components of a gas diffusion electrode for different use streams. Example 13. A method comprising using spent iron from alkaline iron-air batteries as a starter for an artificial reef. Example 14. A method comprising making high value $MnO_2$ from low cost $MnO_2$ by electrochemical conversion. Example 15. A method comprising using one or more electrochemical cell waste stream for water capture, hydrogen capture, heat energy capture, regeneration of $CO_2$ scrubbing agents, or electrolyte recycling. Example 16. Methods and processes for recovering commodity chemicals and/or other materials from an alkaline metal-air battery.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of any embodiment described herein can be used in any other embodiment. The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method, comprising:
   decommissioning an electrochemical system; and
   converting at least one portion of a metal electrode of the electrochemical system into a commodity metal source,
   wherein converting the at least one portion of the metal electrode into the commodity metal source includes pumping an organic solvent into the electrochemical system, where the organic solvent causes an exothermic reaction used for heat in an energy plant and produces the commodity metal source including a metal oxide with crystalline features and uniform composition.

2. The method of claim 1, wherein the commodity metal source comprises iron.

3. The method of claim 2, wherein the commodity metal source comprises direct reduced iron (DRI).

4. The method of claim 1, further comprising using another portion of the metal electrode to form metal-based concrete.

* * * * *